United States Patent
Gupta et al.

(10) Patent No.: US 10,388,121 B2
(45) Date of Patent: Aug. 20, 2019

(54) METHOD FOR PROVIDING NOTIFICATIONS

(71) Applicant: Samsung Electronics Co., Ltd., Suwon-si, Gyeonggi-do (KR)

(72) Inventors: Ayushi Gupta, Noida (IN); Prantik Banerjee, Noida (IN); Theophilus Thomas, Visakhapatnam (IN); Kyoungwoon Hahm, Seoul (KR); Arun Prabhakar, Delhi (IN); Govind Janardhanan, Kannur (IN); Dhananjay L Govekar, Thane (IN); Sudhanwa Suhas Chavan, Noida (IN); Navneet Passi, Ambala Cantt (IN); Abhishek Kumar, Ghaziabad (IN); Avinash Thakur, Ghaziabad (IN); Nitin Setia, Fazilka (IN); Suprateem Bhattacherjee, Ranchi (IN); Sankara Narayanan T, Tirunelveli (IN); Himanshu Jakhmola, Ghaziabad (IN); Sonam Chawla, Ghaziabad (IN); Rekha Agarwal, Jaipur (IN); Atul Sharma, Ghaziabad (IN); Aashaank Pratap, Delhi (IN); Shantanu Kumar Meher, Bengaluru (IN); Arungeeth PS, Koratty (IN); Amit Bansal, Merrut (IN); Kaushal Prakash Sharma, Noida (IN); Jatin Jain, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 15/254,440

(22) Filed: Sep. 1, 2016

(65) Prior Publication Data
US 2017/0365135 A1 Dec. 21, 2017

(30) Foreign Application Priority Data
Jun. 16, 2016 (IN) .............................. 201611020611

(51) Int. Cl.
*G06F 15/02* (2006.01)
*H04M 1/725* (2006.01)
(Continued)

(52) U.S. Cl.
CPC ............. *G08B 3/1025* (2013.01); *G06F 3/03* (2013.01); *G06F 3/03547* (2013.01);
(Continued)

(58) Field of Classification Search
CPC ....................... H04N 5/23222; H04N 5/23293
See application file for complete search history.

(56) References Cited

U.S. PATENT DOCUMENTS

| | | | |
|---|---|---|---|
| 6,341,201 B1 * | 1/2002 | Ishiguro | G03B 17/40 396/300 |
| 7,161,496 B2 | 1/2007 | Bocking et al. | |

(Continued)

FOREIGN PATENT DOCUMENTS

| | | |
|---|---|---|
| EP | 2 312 818 A1 | 7/2009 |
| KR | 10-2014-0111873 A | 9/2014 |
| WO | 2014/088705 A1 | 6/2014 |

OTHER PUBLICATIONS

Kostov V et al, "Analysis of Wearable Interface Factors for Appropriate Information Notification", Wearable Computers, 2004. ISWC 2004. Eighth International Symposium on Arlington, VA, USA 31-03 Oct. 2004, Piscataway, NJ, USA, IEEE, Oct. 31, 2004 (Oct. 31, 2004), pp. 102-109, XP010749634, DOI: 10.1109/ISWC.2004.7 ISBN: 978-0-7695-2186-2 *the whole document*.

(Continued)

*Primary Examiner* — Yongjia Pan
(74) *Attorney, Agent, or Firm* — Jefferson IP Law, LLP

(57) ABSTRACT

A method for providing notifications is provided. The method includes a tangible user interface (TUI) element the receives an input from a computing device coupled to the TUI element. The input is indicative of an outcome corresponding to a functionality of an application on the computing device. Based on the outcome, the TUI element determines at least one illumination pattern from a plurality of pre-stored illumination patterns. Thereafter, the TUI element generates an output based on the at least one determined illumination pattern.

19 Claims, 23 Drawing Sheets

(51) Int. Cl.
  G08B 3/10 (2006.01)
  G06F 3/0482 (2013.01)
  G06F 3/14 (2006.01)
  G08B 6/00 (2006.01)
  H04N 5/232 (2006.01)
  G06F 3/03 (2006.01)
  G06F 3/0354 (2013.01)
  G06F 3/0484 (2013.01)

(52) U.S. Cl.
  CPC ............ G06F 3/0482 (2013.01); G06F 3/14 (2013.01); G08B 6/00 (2013.01); H04N 5/23222 (2013.01); H04N 5/23293 (2013.01); G06F 2203/0339 (2013.01)

(56) References Cited

U.S. PATENT DOCUMENTS

| | | | |
|---|---|---|---|
| 7,973,848 B2 | 7/2011 | Koh | |
| 8,462,223 B2 * | 6/2013 | Suzuki | G06K 9/00255 348/222.1 |
| 8,823,507 B1 | 9/2014 | Touloumtzis | |
| 8,907,819 B2 | 12/2014 | Kagami | |
| 8,923,804 B1 * | 12/2014 | Aldridge, II | H04W 4/008 455/404.2 |
| 8,957,981 B2 * | 2/2015 | Fredlund | H04N 1/00488 348/222.1 |
| 9,104,371 B2 | 8/2015 | Sartee et al. | |
| 9,368,021 B2 | 6/2016 | Touloumtzis | |
| 9,383,803 B2 | 7/2016 | Muralidhar et al. | |
| 9,483,921 B2 | 11/2016 | Sartee et al. | |
| 9,794,441 B2 * | 10/2017 | Eom | H04N 1/2112 |
| 10,003,370 B2 * | 6/2018 | Fathollahi | H04B 1/3888 |
| 2004/0259536 A1 | 12/2004 | Keskar et al. | |
| 2005/0190196 A1 | 9/2005 | O'Neil et al. | |
| 2006/0223547 A1 | 10/2006 | Chin et al. | |
| 2008/0239104 A1 * | 10/2008 | Koh | G06K 9/00221 348/240.99 |
| 2011/0128166 A1 | 6/2011 | Kagami | |
| 2014/0159867 A1 | 6/2014 | Sartee et al. | |
| 2014/0237279 A1 | 8/2014 | Muralidhar et al. | |
| 2014/0368333 A1 | 12/2014 | Touloumtzis | |
| 2015/0111611 A1 * | 4/2015 | Mhun | H04M 1/22 455/556.1 |
| 2015/0153062 A1 | 6/2015 | Kim et al. | |
| 2015/0228168 A1 | 8/2015 | Sartee et al. | |
| 2016/0252951 A1 | 9/2016 | Poornachandran et al. | |
| 2016/0379453 A1 | 12/2016 | Sartee et al. | |
| 2017/0011601 A1 | 1/2017 | Sartee et al. | |

OTHER PUBLICATIONS

European Search Report dated Apr. 18, 2019, issued in European Patent Application No. 16905576.1.

* cited by examiner

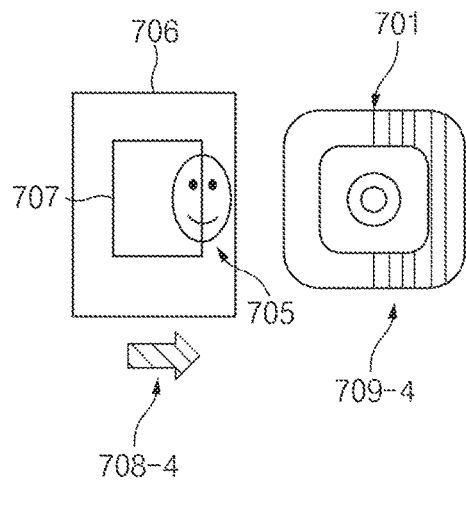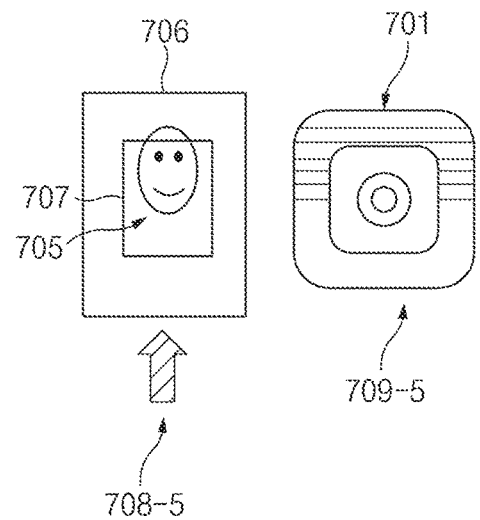
FIG.7E  FIG.7F
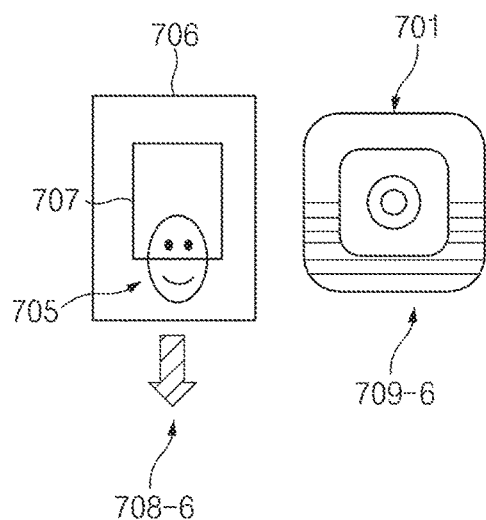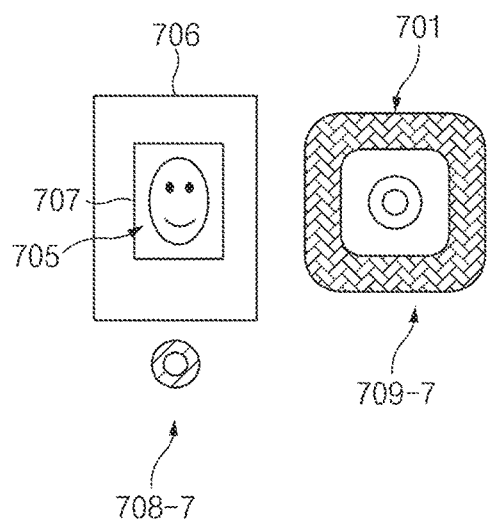
FIG.7G  FIG.7H

METHOD FOR PROVIDING NOTIFICATIONS

CROSS-REFERENCE TO RELATED APPLICATION(S)

This application claims the benefit under 35 U.S.C. § 119(a) of an Indian patent application filed on Jun. 16, 2016 in the Indian Patent Office and assigned Serial number 201611020611, the entire disclosure of which is hereby incorporated by reference.

TECHNICAL FIELD

The present disclosure relates to a method of providing notifications.

BACKGROUND

Present day smart devices such as smartphones, notebooks, and tablets, are now capable of performing multiple tasks such as sending and receiving e-mail and other messages, maintaining a schedule of meetings and events, multimedia calling, multimedia messaging, gaming, capturing images and videos, social networking, and online shopping, in addition to traditional voice calling. Typically, many of these tasks are performed through applications available on the smart devices. The application(s) also notify a user of the smart device events such as incoming calls, received e-mail or multimedia messages, reminders for calendared events, and updates from social network, by way of notification messages, audio alerts, and vibration.

Various solutions are now available that provide notifications by way of light sources such as light-emitting diodes (LEDs) coupled to the smart devices. In one solution, application can be downloaded into the smart device. The application controls the color of LED is accordance with various application and system events based on user settings.

In another solution, the mobile device gathers user's context information from different sources based on user preference or setting. Examples of the context information include ambient light information, tactile information, ambient noise information, accelerometer information, orientation information, calendar information, a user location, a time of day and a date. Examples of the sources include sensors and calendar program. Based on the context information, notification behavior of the mobile device modified. Examples of the notification behavior includes disabling the notification, lowering a volume of the notification, raising the volume of the notification, entering a silent mode, entering a vibrate-only mode, emitting a beep from the mobile device, causing a display screen on the mobile device to flash, and causing an LED on the mobile device to blink.

In one another solution, a color scheme is used to communicate information associated with an event. The event can be incoming calls, incoming call from specific callers, elapsed time, guiding or helping user to perform certain task on the computing device. The color scheme communicates information related to a functional feature of the computing device, personal preferences or brand extension. The color scheme can be associated with the event by the user or can be pre-associated by a service provider. Upon detecting the occurrence of the event, the hardware elements of the computing device such as buttons, keypad, soft keys, and LED, and software elements of the computing device such as contact list entry and color shown on display, are illuminated according to color scheme.

In one another solution, notifications are generated based on one or more environmental conditions such as noisy, quiet, dark, well-lit, vibrations of a mobile computing device, movements of the mobile computing device, sensed the mobile computing device. The notifications can also be based on information related to one or more applications such as email application, word processing application, and synchronization application, that run on the mobile computing device. The mobile device can also detect non-environmental inputs from the user such as tapping the device, moving the device in a particular manner, holding the device, and voice commands, and ignore them in determining parameters of the notifications. The mobile computing device selects one or more output devices such as light sources, speakers, vibration, headset, wireless and earpiece, based on the environment and/or applications to generate the notifications.

In one another solution, backlight of a sub liquid crystal display (LCD) or the backlight of a keypad of terminal are controlled to display various states, such as the residual of a battery, a received signal strength indicator (RSSI), etc., so that a weak-eyed user can easily recognize the states of the terminal.

In another solution, a handheld mobile communication device includes a single notification element and a microprocessor for controlling the single notification element such that the single notification element presents a temporal color pattern to indicate a state of the handheld mobile communication device. The single notification point can be a plurality of light emitting diodes packaged together and can be placed on the top of the device to quickly convey information to a user without the user being required to remove the device from a carrying case. The color pattern is used to alert a user of the device of: a proximate wireless communication connection engaged with another device using a predetermined protocol; a distant wireless communication connection established with a base station; a received message; and a low charge on the battery.

In another solution, a mobile terminal outputs different notification signals according to different type of events. The mobile terminal includes a terminal body; a display which is disposed on the front surface of the body and outputs visual information; physical buttons arranged to be adjacent to the display; and a light source which is arranged in the terminal and outputs light to the physical buttons. The mobile terminal further includes a processor, which controls the pattern of the light output from the light source to output different notification information according to the type of events generated by the terminal.

In one another solution, optical output device(s) coupled to a mobile terminal, that emits light with at least one color, is controlled based on information obtained from various sources. The optical output device can be provided at a front side and/or a rear side of the mobile terminal. A processor controls the optical output device by controlling an emitting color, an emitting duration, and an emitting pattern according to the obtained information and/or user-settings. The information can be stock information, health information, appearance of persons(s) in captured images, user's clothes, user's voice, brightness of surroundings, ambient color, received calls, received messages, and received e-mails, number of and frequency of received calls, received messages, and received e-mails.

In one another solution, a mobile terminal is mounted with a cover to cover a display of the mobile terminal. The cover is provided with a window portion to display the visual information of the display while covering the display, and the cover is formed to output the illuminated notification light at a boundary of the window portion. A processor in the terminal controls the display to illuminate notification light on the window portion in a specific pattern when an event occurs while the display is deactivated and the covered. Examples of the event, but not limited to, includes receiving a call, receiving a message, notifications from application(s), battery charge amount of the mobile terminal is less than a predetermined reference value, and mobile terminal gets out of or into a wireless communication network. Further, when there exists a plurality of events, the processor may partition an outer circumference of the window portion into a plurality of regions based on the number of the plurality of events. Furthermore, the processor may control the display such that a notification light with different colors is output around the plurality of partitioned regions. The cover is further configured to sense a user's touch input in response to the pattern generation. Based on the touch input, event information corresponding to the occurred even is displayed. Event information may be brief information including at least one of a name of the application that has generated an event and a graphic image representing the application, detailed information including the content of the generated event, or the like.

In one another solution, a lighting device is provided in an air conditioner that displays illumination patterns based on predetermined functions and at scheduled time. The lightening device can have plurality of light source elements such as an LED and LCD, substantially arranged in along a circle 0 formation. The illumination patterns are provided by controlling lighting conditions such as color, brightness, order of turning on/off, and duration of the plurality of LEDs. Examples of the predetermined functions can be active lighting according to a surrounding environment at a time of turning on, information description lighting, therapy lighting, mood lighting, and obzee description lighting.

In one another solution, an indicator or LED is placed on front side of an image capturing apparatus. The image capturing apparatus detects faces in captured image; and the indicator responsive to face detection indicates that the image capture device has captured a face.

In another solution, a camera provides a function for self-photographing that a self-photographer cannot only determine whether or not he or she is within the angle of view but can also determine his or her position within the angle of view more accurately than in the prior art. Accordingly, the camera comprising an indicator, and an optical path regulating member that allows, during self-photographing, a photographer to view the indicator with information on the photographer's own position within the photographing angle of view.

In one another solution, an electronic device such as a mobile includes a detection algorithm to determine when a camera lens of the electronic device is properly oriented to capture an item (e.g., a face in a self-portrait). The detection algorithm identifies specific faces or objects, and can directs the electronic device to automatically store a captured image in response to detecting objects or faces of interest. In some embodiments, a motion-sensing component can be used to help align the lens.

As can be gathered from above, the present solutions only provide different types of visual notification in form of illumination patterns through a light source embedded or integrated on the smart device such as mobile device and air conditioner. The visual notifications are generated based on occurrence of predefined event. However, the visual notifications only enable a user to identify certain event has occurred based on underlying application. These solutions do not provide any tangible information related to the event occurred through the visual notifications. Due to the reduced attention span, many of such visual notifications are missed. To overcome this deficiency, some solutions create notifications hierarchy is created based on time. However, since tangible information is not available, the user may not act on the notifications.

Some solutions also enable display of icons or information on display based on user-input such as touch, drag, and tap on the smart device. The user has to perform further action by following normal course of operations. Thus, the solutions utilize touch as the main input and the light sources serve as the output, hence a spatial discontinuity between the two spaces, user input being the main input while vision being the only output.

Thus, there exists a need for a better solution that overcomes the above-mentioned deficiencies.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for generation of color coded physical visual notifications on a tangible user-interface (TUI) element coupled with a computing device based on user-input and occurrence of event on the computing device.

In accordance with an aspect of the present disclosure, the user-input corresponding to invocation of a functionality of an application on the computing device is received. A trigger to network-connected device is transmitted to activate the functionality of the application. Thereafter, an outcome corresponding to the functionality from the application is received. Based on the outcome, at least one illumination pattern is determined from a plurality of pre-stored illumination patterns. Thereafter, an output based on the at least one determined illumination pattern is generated.

Further, a further user-input is received. Based on the user-input, a predefined functionality of a predefined application is activated on one or more devices, the one or more devices including the computing device coupled with the TUI element.

In accordance with another aspect of the present disclosure, the input indicative of occurrence of an event from a network-connected device coupled with TUI element is received. Based on the event, at least one illumination pattern is determined from a plurality of pre-stored illumination patterns. Thereafter, an output based on the at least one determined illumination pattern is generated.

Further, an alert tag associated with the event is determined. The alert tag being indicative of predefined functionality of one or more network-connected devices, wherein the one or more network-connected devices include the network-connected device coupled with TUI element. Thereafter, a trigger to the one or more network-connected devices is provided to activate the predefined functionality.

In accordance with another aspect of the present disclosure, the user-input corresponding to invocation of a functionality of an application on the computing device is received. A trigger to network-connected device is transmitted to activate the functionality of the application. Thereafter, an outcome corresponding to the functionality from the application is received. Accordingly, a selection of one or more network-connected devices is received, such that a predefined functionality of the selected one or more network-connected devices is activated automatically in future upon receiving the outcome.

The advantages of the present disclosure include, but are not limited to, providing a color coded physical visual notification based on illumination pattern, which is itself, based the application invoked on the computing device and event occurred on the computing device. As such, the visual notification comprises information representing direction, surrounding environment, geographical direction, time, battery, surrounding environment, multimedia content, memory, multimedia message, and contact. Therefore, such visual notification comprises are easy to comprehend and to take further action on them. In addition, the physical visual notification is based on the illumination patterns which are itself based on application and event creates a hierarchy in notifications, which in turn filters out a lot of noise and lets users focus on the content that matters.

Further, there is correlation between the input, i.e., user-input and input indicative of event, and output, i.e., physical visual notification, to realize seamless coupling of physical and digital worlds. Thus, there is simulation on the TUI that enables a user to take an action on the physical visual notifications on the TUI that can trigger actions on interconnected devices. As such, overall user-experience is improved.

These aspects and advantages will be more clearly understood from the following detailed description taken in conjunction with the accompanying drawings and claims.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, 6A, 6B, 6C, 6D, 7A, 7B, 7C, 7D, 7E, 7F, 7G, 7H, 7I, 7J, 7K, 7L, 8A, 8B, 9A, 9B, 10A, 10B, 10C, 10D, 11A, 11B, 11C, 12A, 12B, 12C, 12D, 12E, and 12F illustrate manifestations depicting the implementation of the present disclosure according to an embodiment of the present disclosure.

Throughout the drawings, it should be noted that like reference numbers are used to the same or similar elements, features, and structures.

DETAILED DESCRIPTION

Figure 1A:
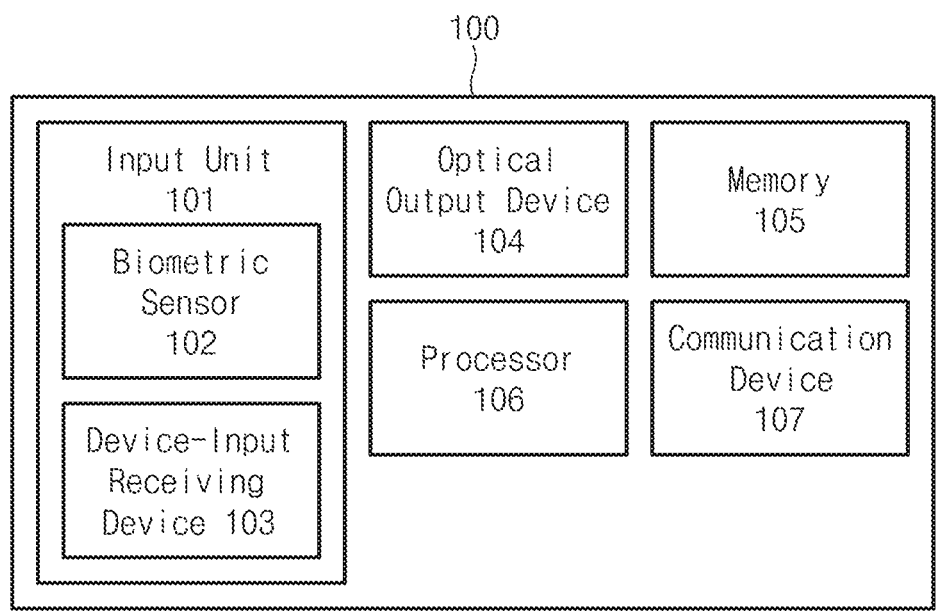
FIG. 1A schematically illustrates a tangible user-interface (TUI) element according to an embodiment the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." it should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

The present disclosure enables providing tangible notifications by using a tangible user interface (TUI). As known in the art, the TUI can be defined as a user interface (UI) in which a user interacts with digital information by manipulation of a physical object. Users may interact with these TUI's by physically interacting with them such as tapping, touching, sorting, stacking, sifting, and playing. Since they represent the underlying data implicitly with their physical form, UIs featuring special-purpose objects can be more limited to a particular application domain or style of interaction. Examples of such application domains include, but not limited to, children's toys for learning and playing music, simulation of circuits, game platforms, simulation of maps & towns, and project planning. Typically, the TUIs are simple block shaped such as cubes, spheres, and hexagons, and complex-shaped such as buildings and towers. The TUIs are coupled with each other over wireless sensor network. The human interactions with the TUIs provide corresponding outcome in accordance with the application. In some application, the TUIs are laid on a graphical interactive table surface and the outcome is displayed on table surface. In one example, TUIs representing building and towers when placed on the table surface provides digital simulations of airflow, shadows, reflections, and other data based on the positions and orientations of TUIs on the table surface.

In accordance with present disclosure, the TUI can be of varied shapes and can be coupled with one or more different computing devices over a network to provide tangible or color coded physical visual notifications based on user-input or occurrence of event on the computing device.

FIG. 1A schematically illustrates TUI (hereinafter referred to as TUI element) (100), according to an embodiment of the present disclosure. The TUI element (100) includes an input device (101) to receive input from a user or a computing device (not shown in the figure). Examples of such computing device include, but not limited to, smart phone, laptop, tablet, smart or internet protocol television (IPTV), wearable devices such as smart watch, controlling devices such as remote controller and selfie sticks with Bluetooth remote, and personal digital assistance (PDA).

Referring to FIG. 1A, the input device (101) includes a biometric sensor (102) adapted to receive the user-input. The user-input can be one of a touch based gesture input such as tap, pinch in, pinch out, shake, tilt, rotate, and double tap, and a non-touch based gesture input as wave, rotate, and proximity patterns. The user-input corresponds to invocation of a functionality of an application on the computing device. The application is designed to provide various services/functionality to a user, with or without accessing data via a network, on the computing device. Examples of the applications include, but not limited to, system application, music application, chat applications, vehicle applications, mail applications, browser applications, messaging applications, e-commerce applications, social media applications, data based media applications, location-based service (LBS) applications, print/scan/fax applications, and search applications. Such applications can be either downloaded onto the computing device or preloaded in the computing device. In one example, 'pinch-in' gesture can invoke 'image capturing' functionality from an image capturing application through a rear camera in a mobile device. In another example, 'wave' gesture can invoke 'weather update' functionality from a weather application on the mobile device. The mapping between the user-input and the functionality of the application is predefined, as explained in later sections.

The input device (101) further includes a device-input receiving device (103) to receive an input from the computing device. The input from the computing device is indicative of indicative of an outcome corresponding to a functionality from the application on the computing device. The outcome is an output of the functionality of the application. The outcome is one of: surrounding environment information, image capturing information, alignment information, multimedia message alert, data usage alert, multimedia content alert, memory status, incoming call alert, missed call alert, battery charging status, time information, and geographical direction information.

Further, the TUI element (100) includes an optical output device (104) to output an illumination pattern. Examples of the optical output device (104) include single light emitting device such as light emitting diode (LED), liquid crystal display (LCD), and an organic light emitting diode (OLED), and an array of light emitting devices. The illumination pattern is defined based on one or more emitting conditions such as emitting colors, emitting duration of each color, and an emitting pattern for each color. In one implementation, the illumination pattern is an animation pattern, which are easy to comprehend and act upon.

Further, the TUI element (100) includes a memory (105) to store a plurality of illumination patterns. Each of the plurality of pre-stored illumination patterns is mapped with outcome of one or more functionalities corresponding to one or more applications. As such, the illumination pattern depicts information corresponding to direction, time, priority, emergency, urgency, and weather. The memory (105) further stores the mapping between the user-input and the functionality of the application, and between the input from the computing device and the event occurred on the computing device. The memory (105) may be a main memory, a static memory, or a dynamic memory.

Further, the TUI element (100) includes a processor (106) to receive the various inputs, determine an illumination pattern from the memory (105) and generate an output on the optical output device (104) based on the determined illumination pattern. The processor (106) may be one or more general processors, digital signal processors, application specific integrated circuits, field programmable gate arrays, servers, networks, digital circuits, analog circuits, and combinations thereof.

Further, the TUI element (100) includes a communication device (107) to enable communication with the computing device and other network-connected devices over a communication link.

Further, the input device (101), the optical output device (104), the memory (105), processor (106), and the communication device (107) are communicatively coupled together through a bus (not shown in the figure). It would be understood that the processor (106) may further include various hardware modules/devices/components or software modules or a combination of hardware and software modules as necessary for implementing the present disclosure.

Further, the TUI element (100) can have varied shapes. Examples of shapes include, but not limited to, ring-shape in circular form, ring-shape in square form with rounded edges, a block shape, and a flat screen. In one implementation, the shape of the TUI is defined according the computing device with which the TUI element is being coupled. In one example, the TUI element is a ring-shaped LED mounted on a rear-camera of a mobile device. The ring-shaped LED can include multiple LEDs. In another implementation, the shape of the TUI element (100) is defined according ease-of-use use such as 'plug-and-play'. In one example, the TUI element (100) is a flat screen mounted on a dashboard of connected car and is communicatively coupled with a mobile device.

FIGS. 1B to 1E illustrate manifestations depicting various shapes of TUI element (100) defined with the computing device according to an embodiment of the present disclosure. However, it may be strictly understood that the forthcoming examples shall not be construed as being limitations towards the present disclosure and the present disclosure may be extended to cover analogous manifestations through other type of like mechanisms.

Figure 1B:
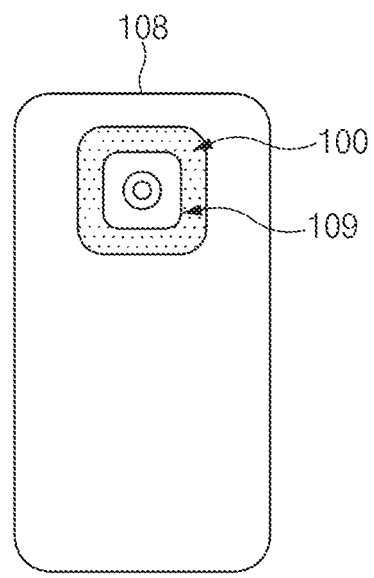
FIGS. 1B, 1C, 1D, and 1E illustrate manifestations of the TUI element according to an embodiment of the present disclosure.

Referring to FIG. 1B, FIG. 1B illustrates a first manifestation depicting the computing device as mobile device (108). In the manifestation, the TUI element (100) is a ring-shaped LED in square form mounted on a rear-camera (109) of the mobile device (108).

Figure 1C:
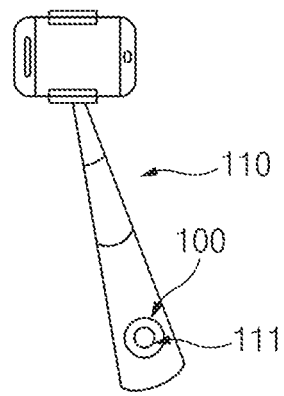

FIG. 1C illustrates a second manifestation depicting the computing device as selfie stick (110) according to an embodiment of the present disclosure. In the manifestation, the TUI element (100) is a ring-shaped LED in circular form mounted on selfie button (111) the selfie stick (110).

Figure 1D:
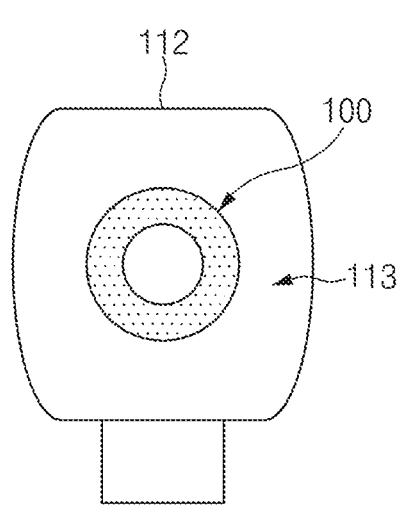

FIG. 1D illustrates a third manifestation depicting the computing device as plug-in device (112) according to an embodiment of the present disclosure. In the manifestation, the TUI element (100) is a ring-shaped LED in circular form mounted on a front side (113) the plug-in device (112).

Figure 1E:
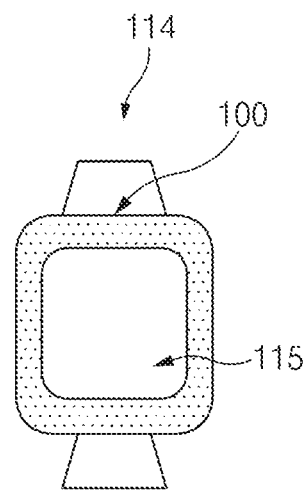

FIG. 1E illustrates a fourth manifestation depicting the computing device as wearable watch (114) according to an embodiment of the present disclosure. In the manifestation, the TUI element (100) is a ring-shaped LED in circular form mounted on a dial (115) of the wearable watch (114).

Figure 2:
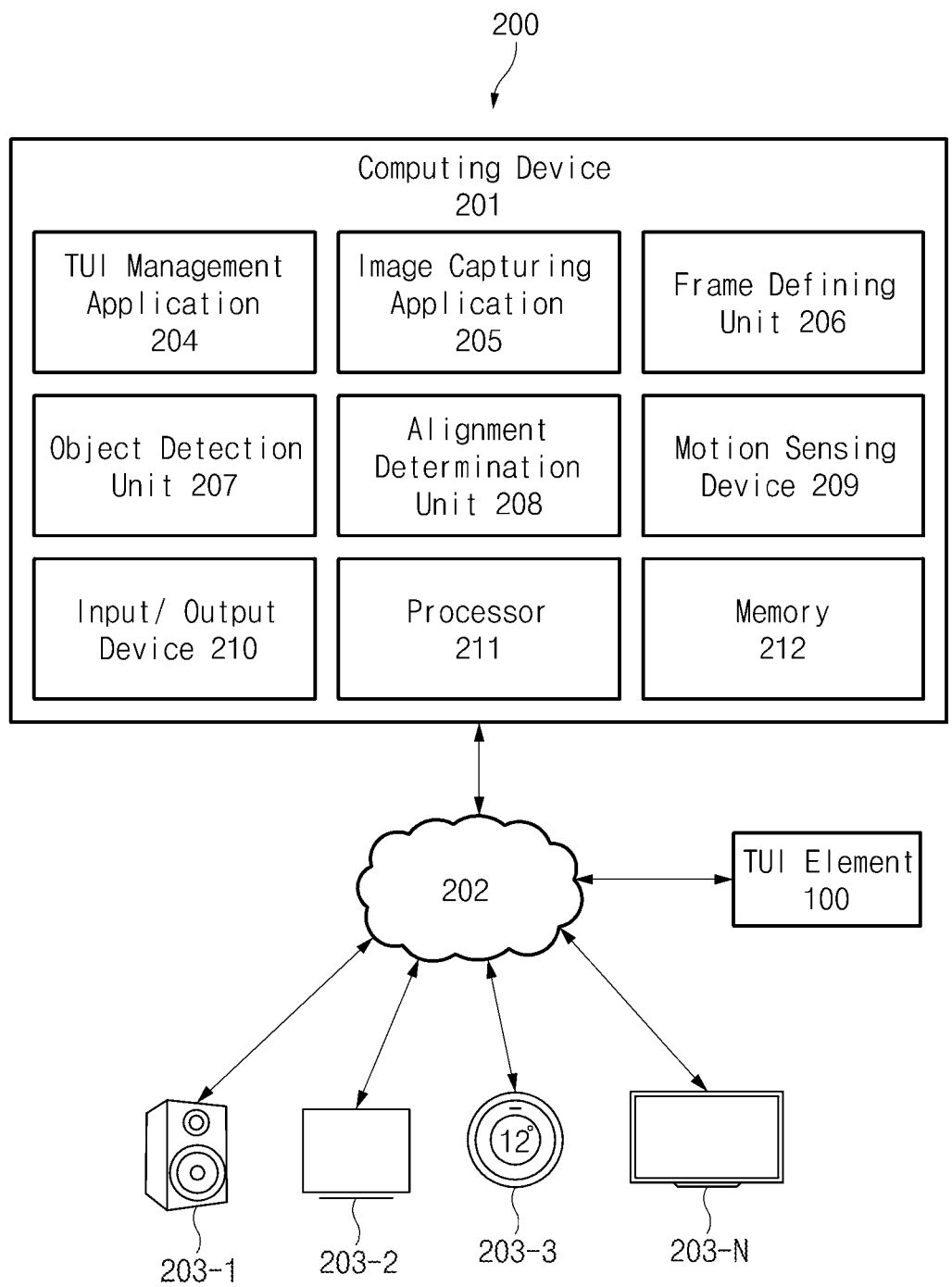
FIG. 2 schematically illustrates a network environment implementation of the TUI element according to an embodiment of the present disclosure.

In accordance with an embodiment of the present disclosure, the TUI element (100) provides the color coded physical visual notifications based either on the user-input or on the occurrence of event(s) on the computing device. Accordingly, FIG. 2 schematically illustrates a network environment implementation (200) of the TUI element (100) in accordance with various embodiments of the present disclosure. The network environment implementation (200) includes the TUI element (100) communicatively coupled with a computing device (201) over a communication link (202). The communication link (202) can be wired or wireless. Examples of communication link (202) include, but not limited to, radio link, short-range communication link, mobile internet, and cloud based communication link. Examples of such computing device (201) include, but not limited to, smart phone, laptop, notebook, tablet, smart or IPTV, wearable devices such as smart watch, controlling devices such as remote controller, selfie sticks, and selfie sticks with Bluetooth remote, and PDA. In one implementation, the TUI element (100) is integrated with the computing device (201). In one example, the TUI element (100) is a ring-shaped LED mounted on a rear-camera of mobile device. In another example, the TUI element (100) is a flat LED screen mounted on a smart TV. In another implementation, the TUI element (100) is independent but communicatively coupled with the computing device (201). In one example, the TUI element (100) is a flat screen mounted on a dashboard of connected car and is communicatively coupled with a mobile device. In one another example, the TUI element (100) is a flat LED screen plugged in to a smart TV and coupled with mobile device and the smart TV.

Referring to FIG. 2, further, the network environment implementation (200) includes one or more other computing devices (203-1 to 203-N) communicatively coupled with the TUI element (100) and the computing device (201) over the communication link (202). The other computing devices (203-1 to 203-N) are hereinafter referred to as network-connected devices (203-1 to 203-N). Examples of such network-commented device include, but not limited to, mobile device, smart TV, note book, laptop, tablet, a smart refrigerator, a smart air conditioner, a smart electric curtain, a smart lamp, a smart oven, a smart vacuum cleaner, smart shutters, smart sprinkling system, a smart socket, a music system, smart speakers, smart thermostat, and smart sensors. In one example, the TUI element (100) is a flat LED screen mounted on a smart TV and is communicatively coupled with the smart TV and a mobile device. In another example, the TUI element (100) is a ring-shaped LED mounted on a rear-camera of mobile device and is communicatively coupled with a smart lamp, a smart vacuum cleaner, smart shutters, and smart sprinkling system. In another example, the TUI element (100) is a cube-shaped LED mounted on a connected car dashboard and is communicatively coupled with a mobile device.

As described earlier, the memory (105) of the TUI element (100) stores the predefined mapping between the user-input and the functionality of the application and between the input from the computing device and the event occurred on the computing device (201) or one of the network-connected devices (203-1 to 203-N). As such, the computing device (201) includes a TUI management application (204). The TUI management application (204) is an application for defining various user-settings such as illumination patterns and mappings. In one implementation, the TUI application (204) can be downloaded onto the computing device (201). In another implementation, the TUI application (204) can be preloaded in the computing device (201) at the time of manufacturing.

FIGS. 3A to 3D illustrate screenshots for configuring the TUI element (100) through the TUI management application (204) on the computing device (201), according to various embodiments of the present disclosure.

Figure 3A:
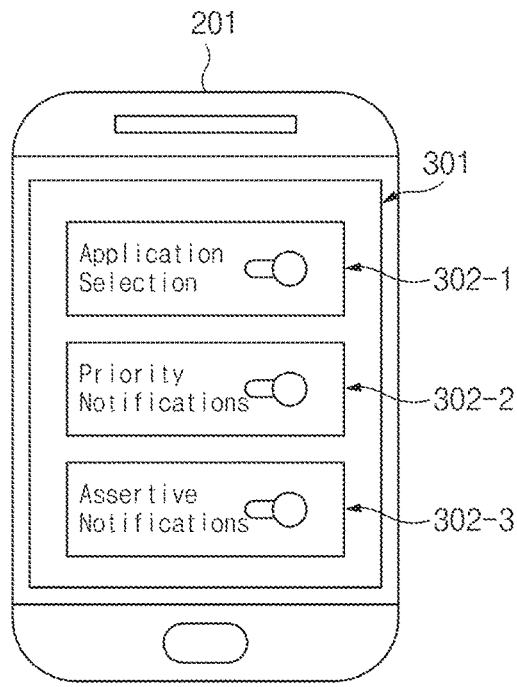
FIGS. 3A, 3B, 3C, and 3D illustrate screenshots for configuring the TUI element according to an embodiment of the present disclosure.

Referring to FIG. 3A, FIG. 3A illustrates a screenshot of the computing device (201) depicting a first user-interface (301) upon accessing the TUI management application (204). The TUI management application (204) can be accessed on the computing device (201) in a plurality of methods, as known in the art. The first user-interface (301) includes a plurality of user-selectable tasks (302) enabling a user to configure various mappings, as described earlier. Accordingly, a first user-selectable task (302-1) enables/disables selection of one or more applications and corresponding functionalities of the one or more applications, which will be invoked upon receiving corresponding user-input. A second user-selectable task (302-2) enables/disables priority notification corresponding to applications running on the computing device (201) or one of the network-connected devices (203-1 to 203-N). A third user-selectable task (302-2) enables/disables assertive notification corresponding to critical system alerts on the computing device (201). In an example, the user-selectable task (302) is depicted as toggle button.

Further, upon enabling the selection of one or more applications through the first user-selectable task (302-1), a second user-interface (303) to select the one or more applications and corresponding functionalities is depicted on the computing device (201). The selected one or more applications and corresponding functionalities are invoked upon receiving user-input.

Figure 3B:
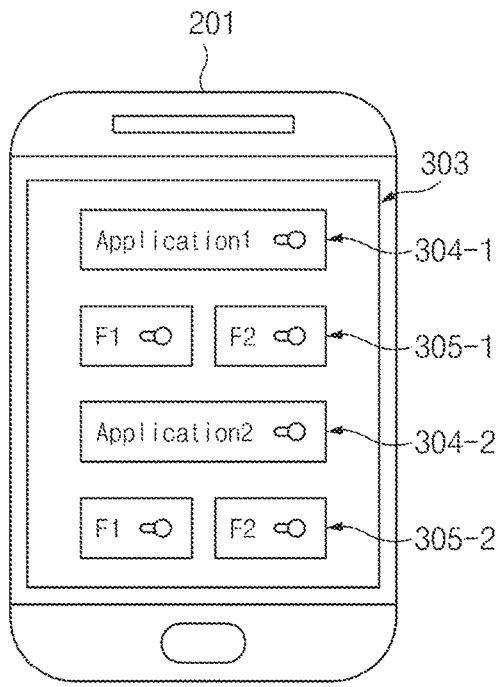

Referring to FIG. 3B, the second user-interface (303) includes a plurality of user-selectable tasks enabling a user to select one or more applications (304-1 and 304-2) and corresponding functionalities (305-1 and 305-2). In one example, the application can be image-capturing application and the functionalities can be capturing image using rear-camera and sharing the captured image. In another example, the application can be clock application and the functionalities can be displaying current time and activating a user-defined profile. As would be understood, the functionalities and associated data will be predefined in a manner as known in the art.

Likewise, enabling a selection of priority notification corresponding to from applications running on the computing device (201) or one of the network-connected devices (203-1 to 203-N) through the second user-selectable task (302-2), a third user-interface (306) to select the events is depicted on the computing device (201).

Figure 3C:
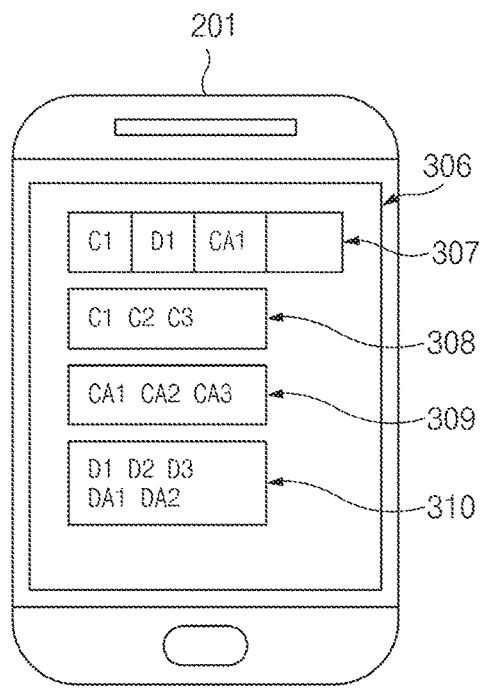

Referring to FIG. 3C, the third user-interface (306) includes a plurality of user-selectable tasks (307) to select the network-connected device, one or more applications running on the network-connected devices (2034 to 203-N), and one or more applications running on the computing device (201). In an example, the plurality of user-selectable tasks (307) is depicted as an icon on the third user-interface (306) such that a number of such icons are equal to the selected network-connected device and selected application. For ease of understanding, the icons on plurality of user-selectable tasks (307) are depicted as D for the network-connected devices (203-1 to 203-N), DA for application running on the network-connected devices (203-1 to 203-N), CA for application running on the computing device (201), and C for contacts selected on the computing device (201). In an example, 'D' can be mobile device and 'DA' music playing application. In another application, 'CA' calling application and 'C' can be contact details of a friend. Thus, upon selection of the applications, tangible or color coded notification is provided by the TUI element based on the outcome of selected applications. For example, upon selecting a contact and a chat application, the TUI element will provide tangible or color coded notification when message is received from the contact.

The third user-interface (306) further includes a list of contacts (308) and list of applications (309) available on the computing device (201). For ease of reference, the contacts are represented as C1, C2, and C3; and the applications are represented as CA1, CA2, and CA3. The user can select contact(s) from the list of contacts (308) and application(s) from the list of applications (309). The user can provide the selection in multiple ways, as known in the art, such as dragging the contact/application onto the user-selectable task (307) and double tapping on the contact/application.

In a similar manner, the third user-interface (306) further includes a list (310) of network-connected devices. In one implementation, the list (310) indicates the network-connected devices (203-1 to 203-N) that are communicatively coupled with the computing device (201) in a manner as known in the art. In another implementation, the list (310) indicates the network-connected devices (203-1 to 203-N) that are connected with the TUI element (100). In such implementation, a further user-interface of the TUI management application (204) enables finding and making connection with one or more network-connected devices (203-1 to 203-N) in a manner as the network-connected devices (203-1 to 203-N) are commutatively coupled with the computing device (201).

Further, enabling a selection of assertive notification corresponding to critical system alerts on the computing device (201) through the third user-selectable task (302-3), a fourth user-interface (310) is depicted on the computing device (201). Examples of system alerts include, but not limited to, data usage alert, memory status, and battery charging status. The system alerts are provided by system applications running on the computing device.

Figure 3D:
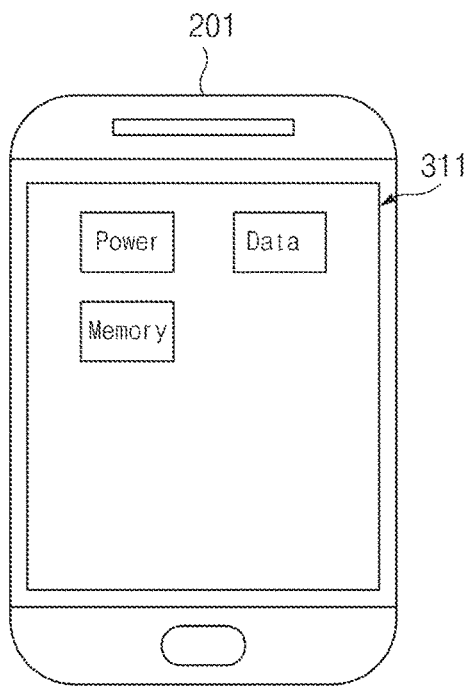

Referring to FIG. 3D, the fourth user-interface (311) depicts icons corresponding to the system applications such as battery or power source, storage, memory usage, and data.

Further, a priority can be set for the selected applications. In one implementation, the priority is predefined. In another implementation, the user can set the priority. Based on the priority, the illumination patterns are fetched to avoid conflicts when multiple outcomes from different applications are received. Furthermore, priority of system application will be higher than or take precedence over priority of other applications. In one example, a system application has higher priority than a chat application. In such example, 'low memory space' outcome form a system application is given higher priority than 'incoming call' outcome from a chat application. In another example, image-capturing application has higher priority than a chat application. In such example, outcome from image capturing application is given higher priority than 'incoming call' outcome from a chat application. In one another example, image-capturing application has highest priority than any other application. In such example, 'battery recharging status' outcome is give lower priority than outcome from image capturing application and 'incoming call' outcome from a chat application.

Upon selection of the applications and corresponding functionalities, the user can select user-input for invoking the selected functionalities. In one implementation, a further user-interface may be depicted to select the user-input from a plurality of pre-stored user-inputs.

Further, the user can select illumination patterns for the application such that the illumination pattern is mapped with outcome of selected functionalities and the applications. In one implementation, a further user-interface may be depicted to select the illumination patterns from a plurality of predefined illumination patterns. In another implementation, a further user-interface may be depicted to create the illumination patterns using one or more emitting conditions such as emitting colors, emitting duration of each color, and an emitting pattern for each color.

Further, a predefined illumination patterns may be associated or mapped with the selected applications and corresponding functionalities by the TUI management application (204). For example, 'weather information' and 'time information' outcomes from weather application and clock application can be mapped with illumination patterns, which are predefined to depict corresponding weather and time simulations. Further, the selected applications and corresponding functionalities and priorities are stored as a list of predefined applications in the memory (105). In the above example, the weather application and the clock application are stored as list of predefined applications such outcome from application other than the weather application and the clock application is not processed further.

Upon receiving the selections, the TUI management application (204) performs the mapping and transmits to the TUI element (100) using the communication link (202). The device-input receiving device (103) receives the mapping and stores the mapping in the memory (105).

Further, the computing device (201) includes an image capturing application (205) for capturing images. The computing device (201) further includes a frame-defining unit (206), an object detection unit (207), an alignment determination unit (208), and a motion-sensing device (209), in accordance with one embodiment of the present disclosure. The functions of the unit will be described in later paragraphs. In addition, the computing device includes an input/output device (210), a processor (211), and a memory (212). In one implementation, the frame-defining unit (206), the object detection unit (207), and the alignment determination unit (208) can be part of the processor (211). In another implementation, the frame-defining unit (206), the object detection unit (207), and the alignment determination unit (208) can be part of the image capturing application (205). In one another implementation, the frame-defining unit (206), the object detection unit (207), and the alignment determination unit (208) can be separate physical entities as shown in the figure.

In operation, the TUI element (100) provides tangible or color coded physical visual notifications, which are easy to comprehend and act upon by the user.

FIGS. 4A to 4D illustrate a method implemented by the TUI element (100) to provide the color coded physical visual notifications based on the user-input, according to an embodiment of the present disclosure. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

Figure 4A:
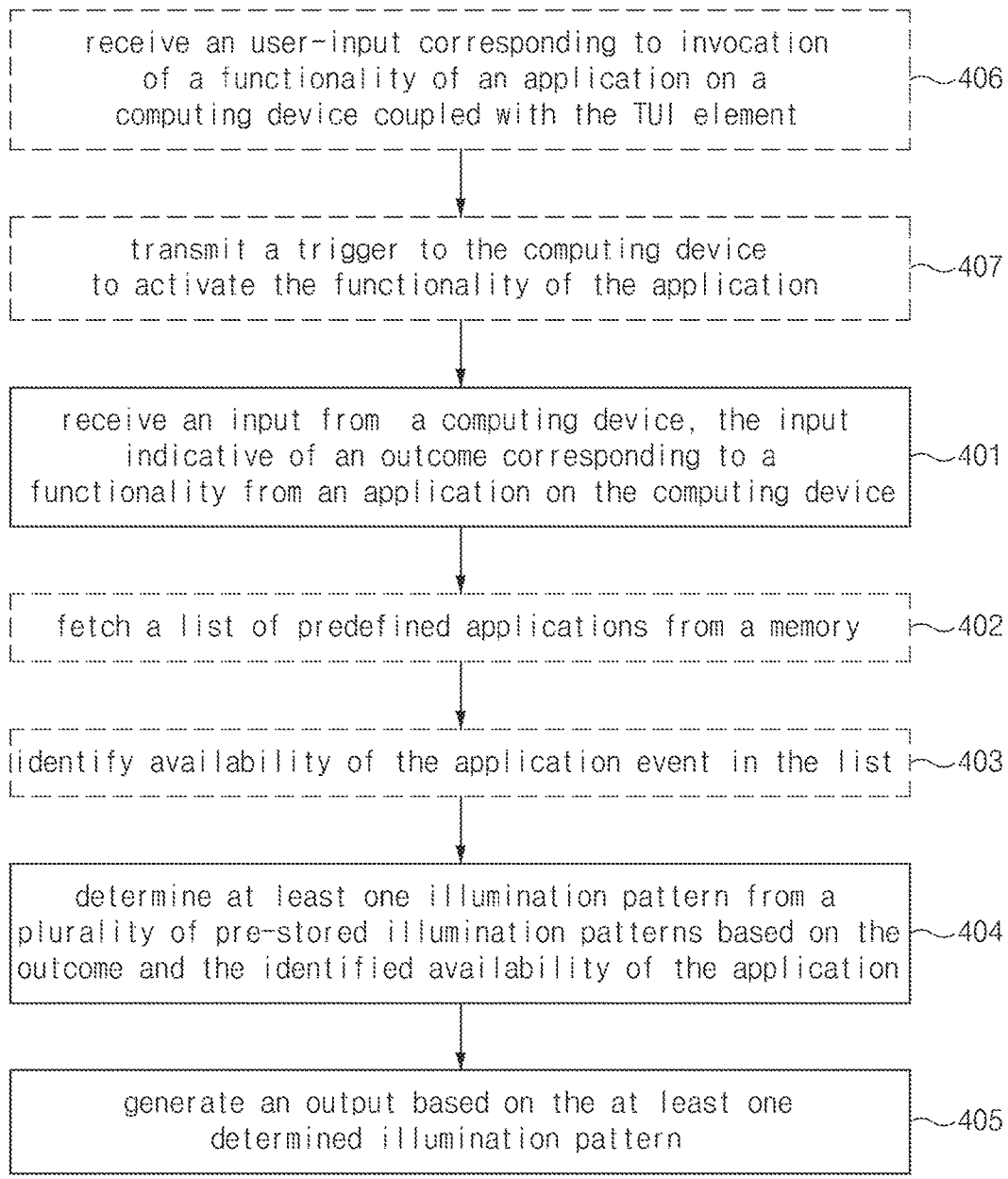
FIGS. 4A, 4B, 4C, and 4D illustrate a method implemented by the TUI element to provide the color coded physical visual notifications according to an embodiment of the present of the present disclosure.
Figure 4B:
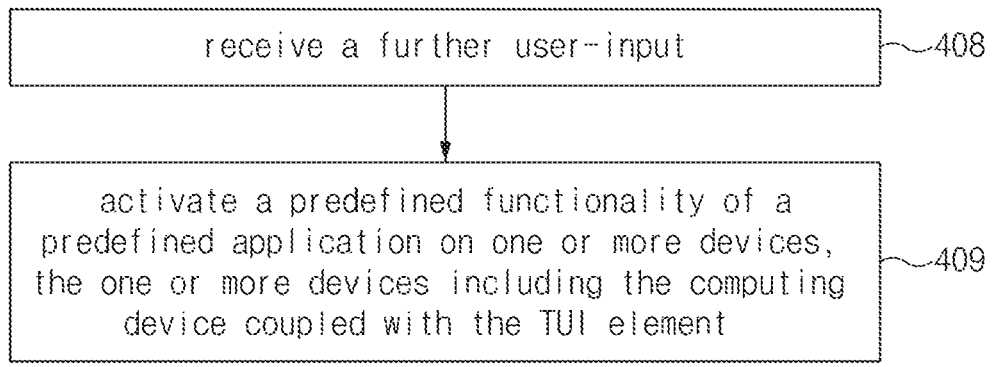

Referring to FIG. 4A, at operation 401, an input from a computing device coupled with TUI element is received. The input is indicative of an outcome corresponding to a functionality from an application on the computing device. The application can be a calling application, image capturing application, utility application, battery status, music application, multimedia calling application, system application, chat application, and user-selected application. Examples of user-selected application include, but not limited to email application. The outcome can be surrounding environment information, image capturing information, alignment information, multimedia message alert, data usage alert, multimedia content alert, memory status, incoming call alert, missed call alert, battery charging status, time information, and geographical direction information.

Referring to FIG. 4A, the device-input receiving device (103) receives the input indicative of the outcome corresponding to functionality from an application on the computing device (201). In one example, the device-input receiving device (103) may receive an input corresponding to 'battery status' outcome from a system application running on a mobile device.

At operation 402, a list of predefined applications is fetched from a memory. Accordingly, the processor (106) fetches the list of predefined applications stored in the memory (105). The list of predefined applications is stored in the memory (105) as described in reference to FIG. 3C.

At operation 403, availability of the application is identified in the list. Accordingly, the processor (106) determines if the application is in the list. If the application is available or present in the list, the process flows to operation 404. However, if the application is not available or not present in the list, the process is terminated. In other words, the processor (106) does not perform any action on the received input. In the above example, if the system application is not present in the list, the TUI element will not determine any illumination pattern and consequently will not generate any output.

At operation 404, at least one illumination pattern from a plurality of pre-stored illumination patterns based on the outcome is determined. The illumination pattern is based on the application and comprises information representing one of: surrounding environment, direction, multimedia message, data usage alert, multimedia content, memory status, incoming call, missed call, battery charging status, time, and geographical direction.

Accordingly, upon receiving the outcome, the processor (106) determines the illumination pattern from the plurality of illumination patterns stored in the memory (105). Such determination is based on the mapping of the illumination pattern and the functionality stored in the memory (105). In the above example, the illumination pattern can be indicative of the determined current battery status. As such, the illumination pattern indicates one or more emitting colors and one or more emitting duration to represent the current battery status. At operation 405, an output is generated based on the at least one determined illumination pattern. The output is generated for a predetermined time. Accordingly, the processor (106) directs the optical output device (104) to generate an output in accordance with the determined illumination pattern. In the above example, the output is generated in accordance one or more emitting colors and one or more emitting duration to represent the current battery status. The output can be generated for 30 seconds.

Further, in one implementation, a user-input can be received prior to receiving the input from the computing device.

At operation 406, a user-input corresponding to invocation of the functionality of the application on the computing device is received. The user-input can be one of a touch based gesture input and a non-touch based gesture input. The functionality and the application are predefined as described above. Accordingly, the biometric sensor (102) of the TUI element (100) receives the user-input. The user-input corresponds to invocation of a functionality of an application on the computing device (201). For example, the user 'flicks' on a TUI element having ring-shaped LED mounted on a rear camera of a mobile device.

At operation 407, a trigger to the computing device is transmitted to activate the functionality of the application.

Accordingly, upon receiving the user-input, the processor (106) may determine the functionally of the application based on the mapping of the user-input and the functionality stored in the memory (105). Upon determining, the processor (106) transmits a trigger to the application to activate the functionality on the computing device (201) over the communication link (202). In the above example, the 'flick' gesture is mapped with invoking clock application by the mobile device and accordingly the TUI element transmits a trigger to the mobile device to invoke the clock application.

Further, in accordance with the embodiment, the user can take action based on the output. Thus, referring to FIG. 4B, at operation 408, a further user-input is received. Accordingly, the biometric sensor (102) receives a further user-input on the TUI element (100). The further user-input can be one of a touch based gesture input and a non-touch based gesture input.

At operation 409, a predefined functionality of a predefined application is activated on one or more devices, the one or more devices including the computing device coupled with the TUI element. Accordingly, upon receiving the further user-input, the processor (106) determines another functionality of the application based on the mapping stored in the memory (105). Examples of the functionality include, but not limited to, sharing an image via one or more sharing applications, associating alert tags with the outcome, and activating a user-profile.

Upon determining the functionality, the processor (106) activates the functionality on the application by transmitting a corresponding trigger to the application. In the above example, upon noticing the output indicating low battery, the user can 'tap' on the ring based LED. Upon tapping, functionality to invoke 'predefined battery saver' profile of the application is invoked on the mobile device. In one implementation, the processor (106) can determine a functionality of different application on the computing device (201). In another implementation, the can determine a functionality of different application the network-connected devices (203-1 to 203-N). In such implementation, the processor (106) can transmit a trigger to the network-connected devices (203-1 to 203-N) indicating the functionality to be invoked over the communication link (202).

Further, in one implementation of the present embodiment, the application is an image capturing application and the functionality is capturing image of at least one object. In such implementation, the outcome is indicative of an alignment of the at least one object with respect to a capture frame on a display of the computing device. The capture frame is desired part of the display where the user wants to capture the image of the at least one object. The alignment of the at least one object is indicative of either the object being partially outside the capture frame or the at least one object being completely inside the capture frame. In one aspect of the implementation, the capture frame is a rectangular frame. The computing device (201) generates the capture frame based on user-input. The capture frame is user-configurable. In other words, the user can define a size of the capture frame. In one example, the user can adjust height and width of the rectangular frame.

Accordingly, the biometric sensor (102) receives the user-input corresponding to invoking the image capturing application (205) on the computing device (201). Upon receiving the user-input, the processor (106) transmits a trigger to the computing device (201) over the communication link (202) to invoke the 'capturing image of an object'. In one example, the computing device (201) can mobile device and the object can be a single user. In another example, the computing device (201) can mobile device and the object can be a group of users.

Referring to FIG. 2 again, upon receiving the trigger, the computing device (201) invokes the image capturing application (205). The capture frame-defining unit (206) generates the capture frame on a display. In one implementation, the capture frame is generated based on pre-stored size. The object detection unit (207) detects the object and calculates a position of the object within the capture frame. In an example, the object is human being and the object detection unit (207) is a face detection engine. Based on the detected position, the alignment determination unit (208) determines an alignment of the object with respect to the capture frame. The alignment determination unit (208) provides the determined alignment as the outcome to the processor (106). Accordingly, the processor (106) determines a first illumination pattern to indicate the outcome.

Further, the object detection unit (207) is communicatively coupled with a motion-sensing device (209). The motion-sensing device (209) detects a movement of the computing device (201) or the object and provides the detected movement to the object detection unit (207). The object detection unit (207) again calculates a position of the object within the capture frame and the alignment determination unit (208) determines a predictive movement of the object based on the determined alignment such that the object is completely inside the capture frame. The alignment determination unit (208) provides the predictive movement of the object as the outcome to the processor (106). Accordingly, the processor (106) determines a second illumination pattern to indicate the outcome. Further, the processor (106) manages the optical output device (104) such that the optical output device (104) generates output to indicate both the first and the second illumination patterns simultaneously.

Further, once the alignment determination unit (208) determines the at least one object is within the capture frame, the alignment determination unit (208) provides a trigger to the image capturing application (205) to capture the image. Upon receiving the trigger, the image capturing application (205) captures the image automatically without any manual intervention from the user. Upon auto-capturing the image, the image capturing application (205) provides an outcome indicative of the auto-capture of the image of the at least the object to the processor (106). Accordingly, the processor (106) determines a second illumination pattern to indicate the outcome.

In an implementation, the illumination patterns for the different outcomes are predefined and stored in the memory (105). In another implementation, the illumination patterns are defined by the user through the TUI management application (204), as described earlier. Further, as described earlier in reference to FIG. 4B, upon receiving a further user-input on the TUI element (100) during generation of the output, the TUI element (100) can activate a predefined activity of the image capturing application (205).

Although the above description is with respect to user-input, the illumination pattern can be determined upon receiving the outcome from the computing device (201) that an image is being captured without invoking the application through the user-input on the TUI element.

Figure 4C:
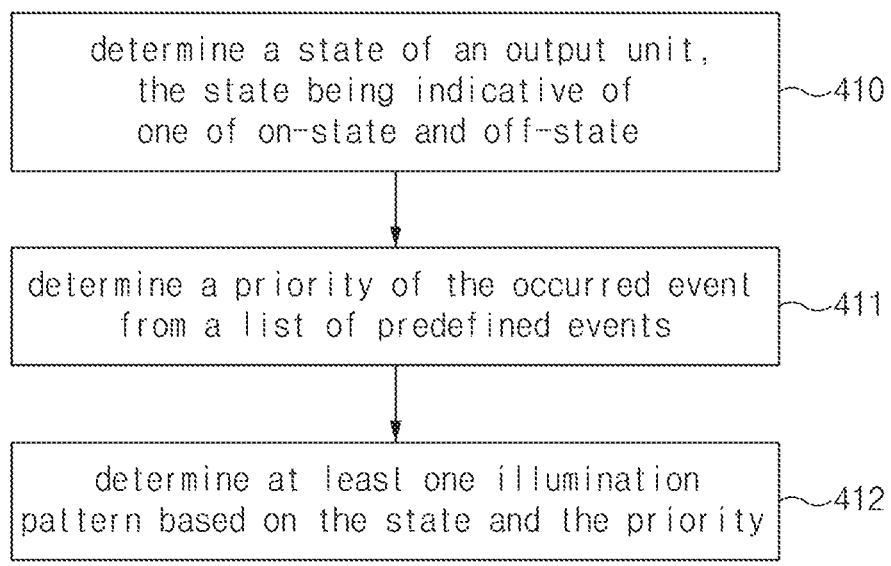

Further, referring to FIG. 4C, the determination of the at least one illumination pattern comprises further operations. Accordingly, at operation 410, a state of an output device is determined. The state being indicative of one of on-state and off-state. Thus, the processor (106) determines whether the optical output device (104) is in on-state, i.e., output is being generated by the optical output device (104) or the optical output device (104) is in off-state, i.e., output is not being generated by the optical output device (104).

At operation 411, a priority of the application is determined from a list of predefined applications. Accordingly, the processor (106) determines a priority of the application from the list of the applications fetched from the memory (105), as described at operation 403.

At operation 412, the at least one illumination pattern is based on the state and the priority. Accordingly, the processor (106) determines the illumination pattern based on the state and the priority to avoid conflicts when multiple inputs indicative of different outcomes from different applications are received. For example, the optical output device (104) is in off-state and outcome from application E1 is received, then the output is generated according to the outcome. However, if the optical output device (104) is in on-state and outcome from application E1 is received, then priority of application E1 is determined. If priority of application E1 is higher than a priority of application E2, for which current output is being generated, then the state of the optical output device (104) is immediately set to off-state and then the output is generated according to the outcome from application E1. In contrast, if priority of application E1 is lower than the priority of application E2, for which current output is being generated, then the output is generated according to the outcome from application E1 upon elapse of the predetermined time of the current output.

Figure 4D:
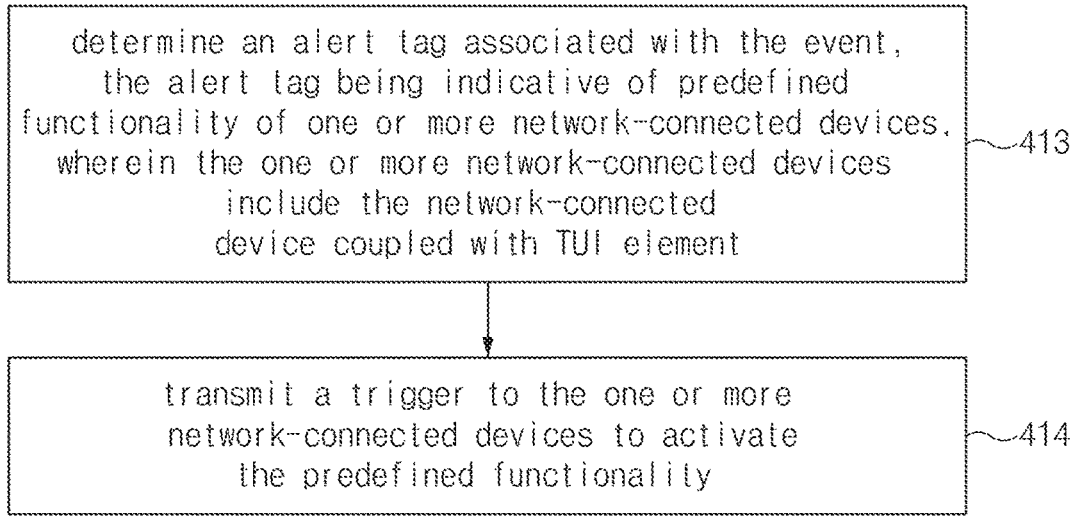

Further, triggers can be transmitted to one or more network connected devices based on the outcome. Referring to FIG. 4D, at operation 413, an alert tag associated with the outcome is determined. The alert tag is indicative of predefined functionality of one or more computing devices. The one or more network-connected devices include the computing device coupled with TUI element.

Accordingly, the processor (106) determines the predefined functionality and the computing devices based on the mapping stored in the memory (105). In an example, the alert tag can be for 'low data' and the predefined functionality can be 'connect with data recharge device over Wi-Fi'.

At operation 414, a trigger is provided to the one or more computing devices to activate the predefined functionally. Accordingly, the processor (106) can transmit a trigger over the communication link (202) to the network-connected device to activate the predefined functionality. In the above example, the processor (106) can transmit a trigger to the 'data recharge device' to start recharging the mobile device 'over Wi-Fi'.

Further, in one implementation of the present embodiment, upon generating the output based on an outcome from an application, the user can select one or more network-connected devices, such that a predefined functionality of the selected one or more network-connected devices is activated automatically in future upon receiving the outcome. Accordingly, the processor (106) may provide a user-interface is depicted on the computing device (201). The user-interface enables the user to select one or more network connected device and functionality. The user-interface is same as the user-interface described in reference to FIG. 3C earlier. This enables the user to select the network-connected devices dynamically or on the fly based on outcome.

The device-input receiving device (103) then receives the outcome from the selected one or more network-connected device over the communication link (202), as described in operation 401. The processor (106) then transmits a trigger over the communication link (202) to the network-connected device to activate the predefined functionality, as described at operation 414.

FIGS. 5A and 5B, 6A to 6D, 7A to 7L, 8A and 8B, 9A and 9B, 10A to 10D, 11A to 11C, and 12A to 12F illustrate manifestations depicting the implementation of the present disclosure, as described with reference to FIGS. 1A to 1E, 2, 3A to 3D, and 4A to 4D above. However, it may be strictly understood that the forthcoming examples shall not be construed as being limitations towards the present disclosure and the present disclosure may be extended to cover analogous manifestations through other type of like mechanisms.

Figure 5A:
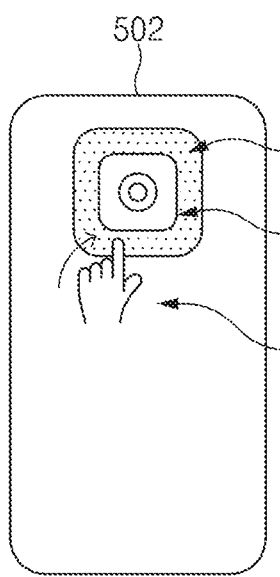
Figure 5B:
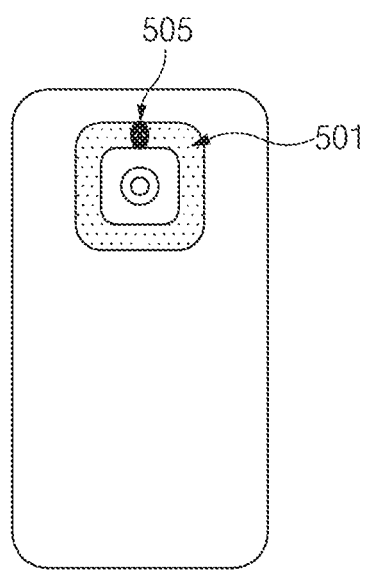

FIGS. 5A and 5B illustrate a first manifestation depicting a TUI element (501) coupled to a mobile device (502) according to an embodiment of the present disclosure. The TUI element (501) is a ring-shaped LED mounted on a rear-camera (503) of the mobile device (502).

Referring to FIG. 5A, user-input (504) is received by the TUI element (501). The user input (504) corresponds to invocation of geographical direction functionality of a compass application. In an example, the user-input (504) is a flick-left gesture.

Upon invoking the application, the application provides an outcome indicative of 'North' direction. Upon receiving the outcome, the TUI element (501) determines an illumination pattern to simulate the 'North' direction and generates the output in accordance with the illumination pattern.

Referring FIG. 5B, TUI element (501) generates output (505) indicative of 'North' direction (represented by circle in the TUI element). In an example, the TUI element (501) can emit blue color to simulate 'North' direction.

FIGS. 6A to 6D illustrate a second manifestation depicting a TUI element (601) coupled to a mobile device (602) according to an embodiment of the present disclosure. The TUI element (601) is a ring-shaped LED mounted on a rear-camera (603) of the mobile device (602).

Figure 6A:
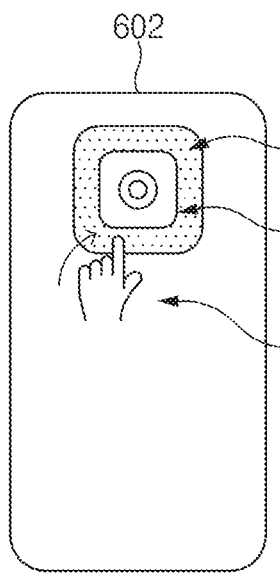
Figure 6B:
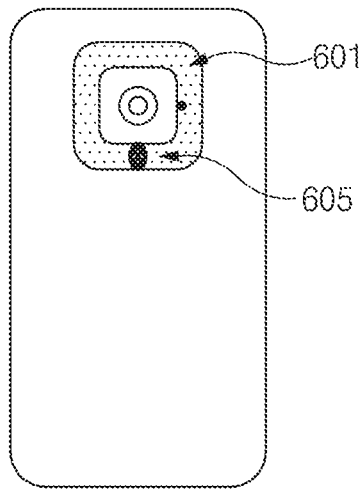

Referring to FIG. 6A, user-input (604) is received by the TUI element (601). The user input (604) corresponds to invocation of time functionality of a clock application. In an example, the user-input (604) is a flick-left gesture.

Upon invoking the application, the application provides an outcome indicative of current time. Upon receiving the outcome, the TUI element (601) determines an illumination pattern to simulate the current time and generates an output in accordance with the illumination pattern. Referring FIG. 6B, TUI element (601) generates output (605) indicative of current time 6:15 PM (represented by two circles in the TUI element). In an example, the TUI element (601) can emit blue color to simulate 6:15 PM.

Figure 6C:
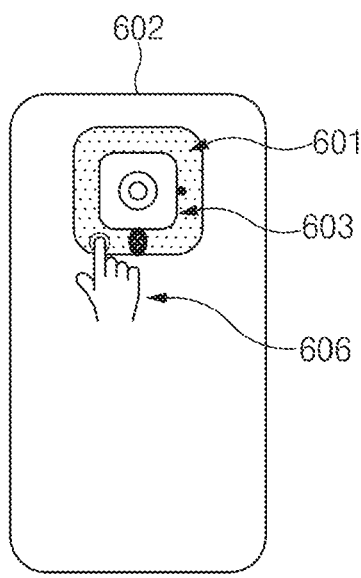

Further, referring FIG. 6C, upon receiving a further user-input (606) on the TUI element (601) during generation of the output, the TUI element (601) can activate a predefined activity of the predefined application. Thus, while the time is being displayed on the TUI element (601), if the user taps on the TUI element (601), then a predefined user profile such as 'out of work' profile is activated. The user profile is predefined or pre-set in a manner as discussed with reference to FIG. 3B.

Figure 6D:
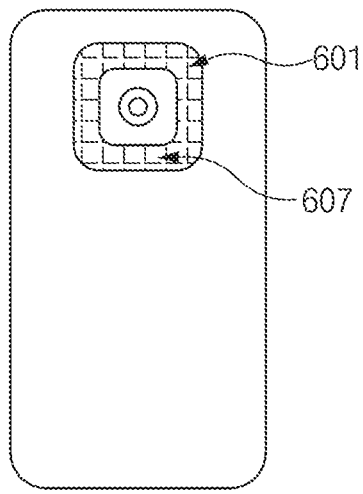

Referring FIG. 6D, the mobile device (602) displays a notification indicative of activation of the 'out of work' profile on a display (i.e., on front side of the mobile device) and accordingly the TUI element (601) generates an output (607) to indicate activation of the 'out of work' profile (represented by a pattern).

FIGS. 7A to 7L illustrate a third manifestation depicting a TUI element (701) coupled to a mobile device (702). The TUI element (701) is a ring-shaped LED mounted on a rear-camera (703) of the mobile device (702) according to an embodiment of the present disclosure.

Figure 7A:
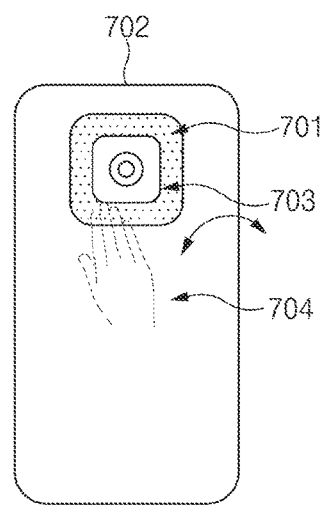

Referring to FIG. 7A, user-input (704) is received by the TUI element (701). The user input (704) corresponds to invocation of image capturing functionality of an image capturing application through the rear-camera (703). In an example, the user-input (704) is a wave gesture.

Upon invoking the application, the mobile device (702) generates a capture frame (703). The mobile device (202) determines an alignment of face of the user (704) with respect to the capture frame (703) and accordingly provides an outcome to the TUI element (701). The TUI element (701) accordingly determines an illumination pattern and generates an output. Likewise, the mobile device (702) detects a movement of the user and determines predictive movement of the user based on the alignment. The mobile device (702) provides an outcome to the TUI element (701). The TUI element (701) accordingly determines an illumination pattern and generates an output.

Figure 7B:
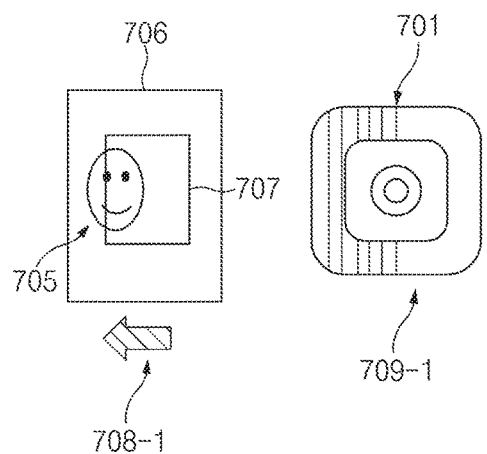

Referring to FIG. 7B, the image (706) is a rear-selfie of a single user. Accordingly, an outcome (705) is indicative of the face of the user being aligned towards 'left' of the capture frame (707) and therefore an illumination pattern (708-1) indicative of 'left' direction (represented by directional arrow) is determined. Accordingly, the TUI element (701) generates the output (709-1) in accordance with the illumination pattern. In one example, the output can be an animation simulating 'left' direction.

Figure 7C:
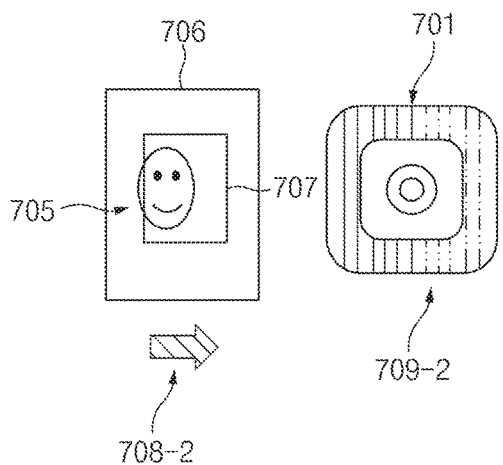

Referring to FIG. 7C, when the user starts moving towards 'left' direction, the outcome is indicative of the face of the user being aligned towards further 'left' of the capture frame (707) and therefore an illumination pattern (708-2) indicative of 'left' direction and 'incorrect direction' (represented by directional arrow) is determined. Accordingly, the TUI element (701) generates the output (709-2) (represented by dash dot lines) in accordance with the illumination pattern. In an example, the output can be an animation simulating 'left' direction in 'red' color to indicate the camera/face is moving in the incorrect direction. In addition, the emitting duration is changed to indicate the incorrect direction. In the present example, the LED can blink slowly.

Figure 7D:
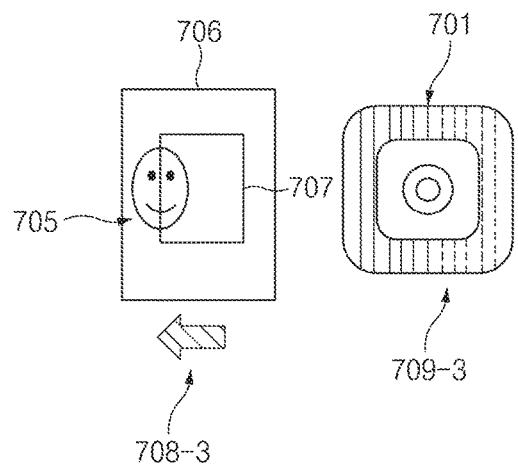

On the other hand, referring to FIG. 7D, when the user starts moving towards 'right' direction, the outcome is indicative of the face of the user being aligned towards 'left' of the capture frame (707) and therefore an illumination pattern (708-3) indicative of 'right' direction and 'correct' direction (represented by directional arrow) is determined. Accordingly, the TUI element (701) generates the output (709-3) (represented by dashed lines) in accordance with the illumination pattern. In an example, the output can be an animation simulating 'right' direction in 'green' color to indicate the camera/face is moving in the correct direction. In addition, the emitting duration is changed to indicate the correct direction. In the present example, the LED can blink fast.

Referring to FIG. 7E, an outcome (705) is indicative of the face of the user being aligned towards 'right' of the capture frame (707) and therefore an illumination pattern (708-4) indicative of 'right' direction (represented by directional arrow) is determined. Accordingly, the TUI element (701) generates the output (709-4) (represented by solid lines) in accordance with the illumination pattern. In one example, the output can be an animation simulating 'right' direction.

Referring to FIG. 7F, an outcome (705) is indicative of the face of the user being aligned towards 'up' of the capture frame (707) and therefore an illumination pattern (708-5) indicative of 'up' direction (represented by directional arrow) is determined. Accordingly, the TUI element (701) generates the output (709-5) in accordance with the illumination pattern. In one example, the output can be an animation simulating 'up' direction.

Referring to FIG. 7G, an outcome (705) is indicative of the face of the user being aligned towards 'down' of the capture frame (707) and therefore an illumination pattern (708-6) indicative of 'down' direction (represented by directional arrow) is determined. Accordingly, the TUI element (701) generates the output (709-6) in accordance with the illumination pattern. In one example, the output can be an animation simulating 'down' direction.

Referring to FIG. 7H, an outcome (705) is indicative of the face of the user being aligned 'completely inside' the capture frame (707) and therefore an illumination pattern (708-1) indicative of 'completely inside' (represented by concentric circles) is determined. Accordingly, the TUI element (701) generates the output (709-1) (represented by a pattern) in accordance with the illumination pattern. In one example, the output can be an animation simulating 'completely inside' in blue color.

Once the face of the user is aligned 'completely inside' the capture frame (707), the image of the user is auto-captured and an illumination pattern is determined. Accordingly, the TUI element (701) generates an output in accordance with the illumination pattern. In one example, the output can be an animation simulating 'auto-captured image' in blue and green color.

Figure 7I:
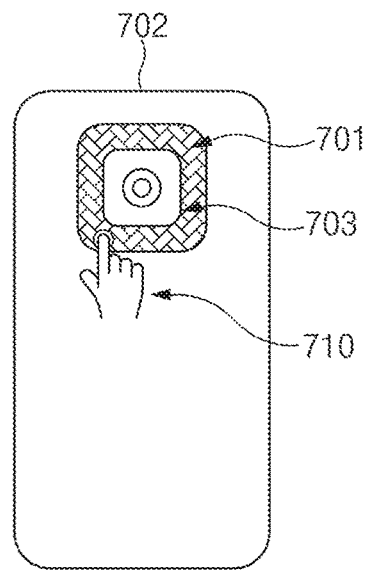
Figure 7J:
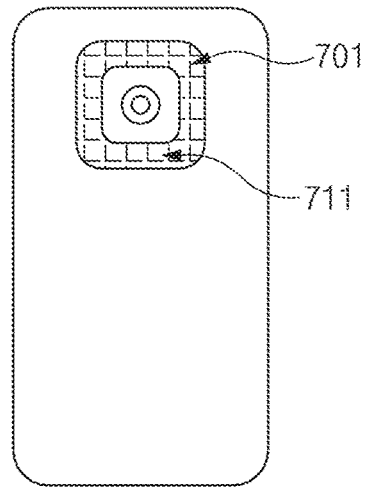

Further, referring to FIG. 7I, upon capturing the image, the TUI element (701) receives a further user-input (710) to activate a predefined sharing functionality of the image-capturing application is invoked. Accordingly, the captured image is shared via a predefined sharing application. The sharing applications is predefined or pre-set in a manner as discussed with reference to FIG. 3B. Referring to FIG. 7J, the TUI element (701) may generate the outcome (711) (represented by a pattern) to indicate activation of the sharing functionality. In one implementation, the captured image is shared automatically. In another implementation, the captured image is shared manually.

Thus, the present disclosure enables tangible or color coded directional information while capturing images such as self-image with camera, especially with rear camera. Such tangible directional information is easier to comprehend and act upon further, thereby improving user-experience.

Figure 7K:
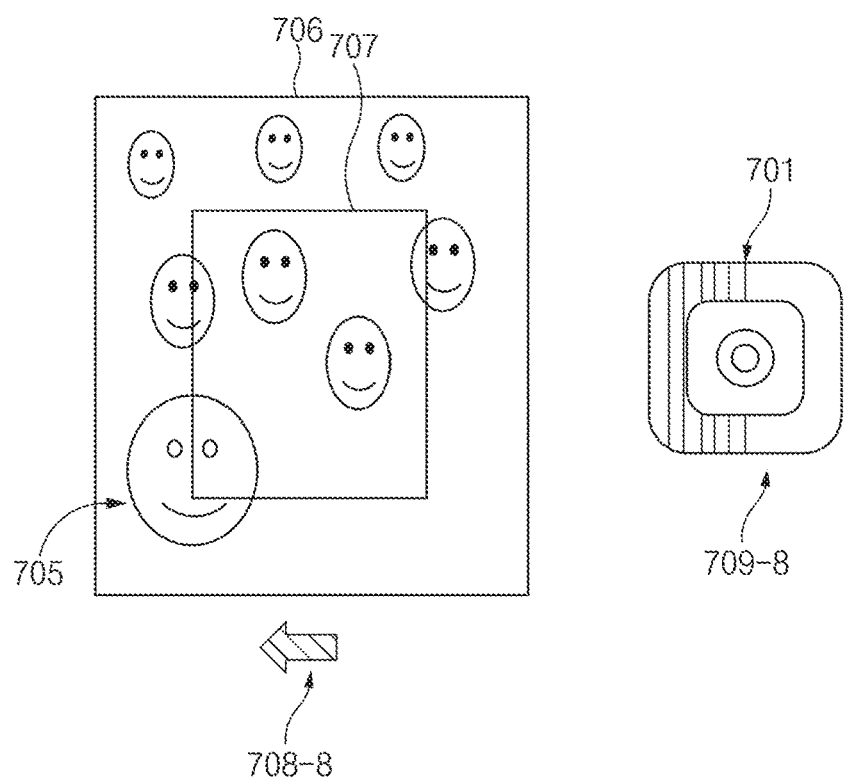

Further, the directional information can also be provided while taking an image of group of objects. The processing of the image of the objects in the group is accordingly similar to processing of image of single user, as described above. In one implementation, the directional information is provided with reference to the object, who is most near to the image capturing device. FIG. 7K illustrates a manifestation of an image, which is a rear-selfie of a group of users. Accordingly, an outcome (705) is indicative of the face of a user, who is most near to the rear camera (702) (represented by big face), being aligned towards 'left' of the capture frame (707) and therefore an illumination pattern (708-8) indicative of 'left' direction (represented by directional arrow) is determined. Accordingly, the TUI element (701) generates the output (709-8) in accordance with the illumination pattern. In one example, the output can be an animation simulating 'left' direction.

Figure 7L:
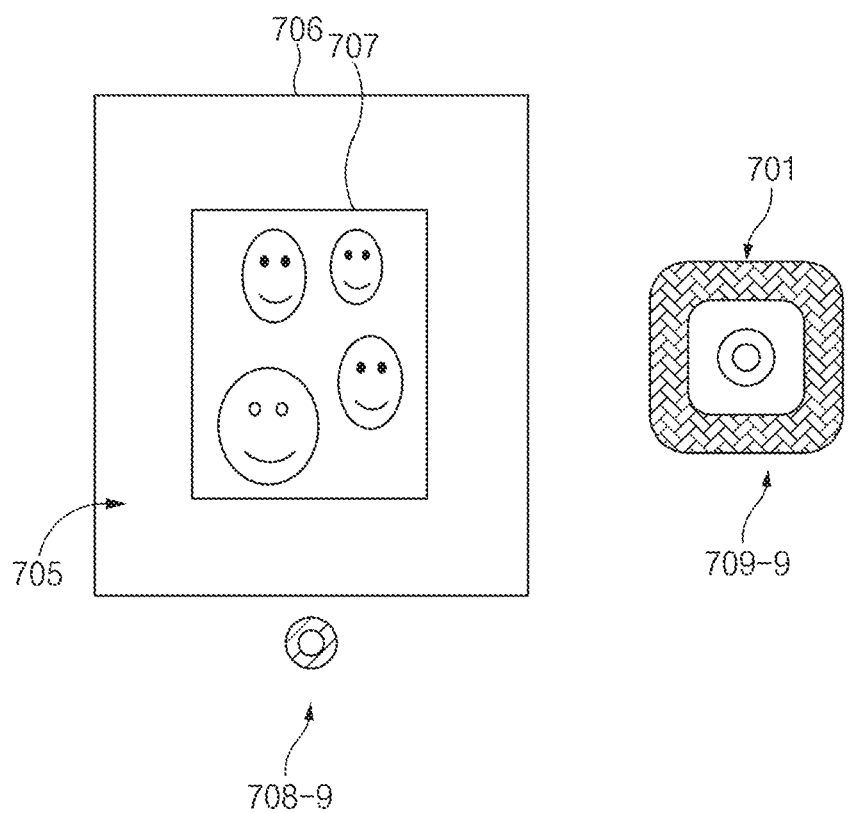

In another implementation, the directional information is provided with reference to all the objects in the group. FIG. 7L illustrates a manifestation of an image, which is a rear-selfie of a group of users. Accordingly, an outcome (705) is indicative of the face of all uses (represented by faced), being aligned 'within' the capture frame (707) and therefore an illumination pattern (708-9) indicative 'within' the capture frame (represented by circle) is determined. Accordingly, the TUI element (701) generates the output (709-9) in accordance with the illumination pattern. In one example, the output can be an animation simulating 'within' the capture frame.

Although the above description is with respect to user-input, the illumination pattern (708) and the output (709) can be determined upon receiving corresponding outcome from the computing device (201) without invoking the application through the user-input on the TUI element.

Accordingly, device-input receiving device (103) receives the input indicative of capturing image. Thereafter, the processor (106) further receives an outcome from the computing device (201). The outcome is indicative of an alignment of the object with respect to a capture frame on a display of the computing device (201). Thus, the processor (106) then determines the illumination pattern based on the outcome, as described earlier with reference to FIGS. 4A to 4D and 7A to 7L.

Figure 8A:
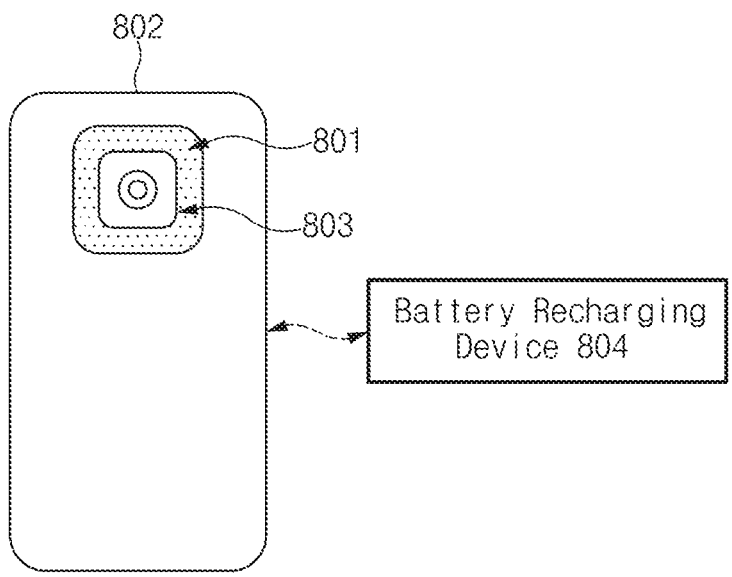
Figure 8B:
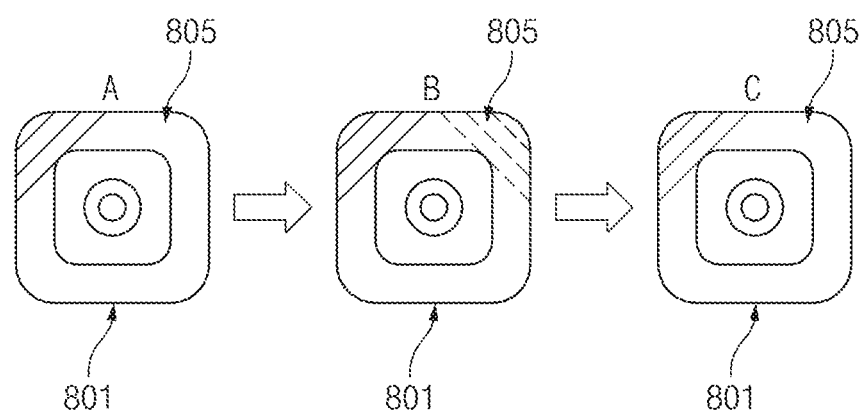

FIGS. 8A and 8B illustrate a fourth manifestation depicting a TUI element (801) coupled to a mobile device (802) according to an embodiment of the present disclosure.

Referring to FIG. 8A, the TUI element (801) is a ring-shaped LED mounted on a rear-camera (803) of the mobile device (802). Upon receiving input indicative of outcome corresponding to 'battery charging information', i.e., detection of connection of the mobile device (802) with a battery-recharging device (804), the TUI element determines an illumination pattern to simulate the recharging status and progress, and generates the output in accordance with the illumination pattern.

Referring to FIG. 8B, the TUI element (801) is divided into 4 quadrants wherein each quadrant represents a range of battery such as 1st quadrant (0-25%), 2nd Quadrant (25-50%), 3rd quadrant (50-75%) & 4th quadrant (75-100%). At any time during battery charging, the user can view the status by output (805) generated by the TUI element (801). In an example, the TUI element (801) depicts the quadrant that is charged in solid green color and the quadrant currently being charged in blinking yellow color. Accordingly, for depicting battery status 35% while charging, the first quadrant (0-25%) is shown in solid lines and the second quadrant (25-50%) currently being charged is shown in dashed lines (represented by A, B, and C).

Figure 9A:
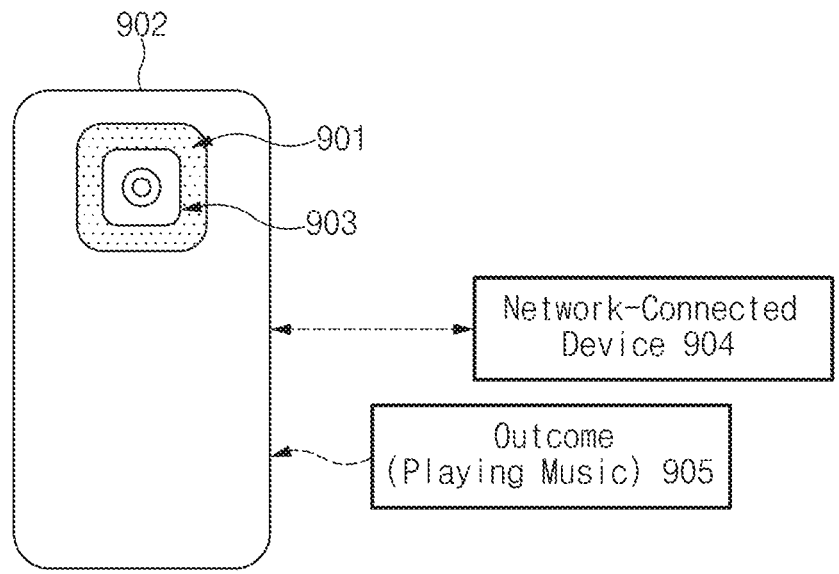
Figure 9B:
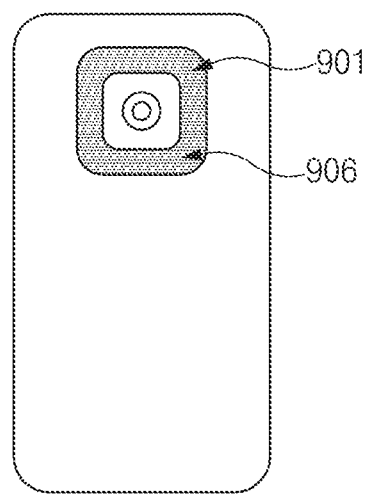

FIGS. 9A and 9B illustrate a fifth manifestation depicting a TUI element (901) coupled to a mobile device (902) according to an embodiment of the present disclosure.

Referring to FIG. 9A, the TUI element (901) is a ring-shaped LED mounted on a rear-camera (903) of the mobile device (902). The TUI element (901) and the mobile device (902) are communicatively coupled with a network-connected device (904). Example of the network-connected device (904) includes but not limited to, a music player, smart phone, and laptop. Upon receiving input indicative of an outcome (905), corresponding to playing of music on the network-connected device (904), the TUI element (901) determines an illumination pattern to simulate the playing of music and generates the output in accordance with the illumination pattern.

Referring to FIG. 9B, TUI element (901) can generate output (906) indicative of music (represented gradient pattern). In an example, the MI element (901) emits one or more colors in different conditions to music.

FIGS. 10A to 10D illustrate a sixth manifestation depicting a TUI element (1001) coupled to a mobile device (1002) according to an embodiment of the present disclosure.

Figure 10A:
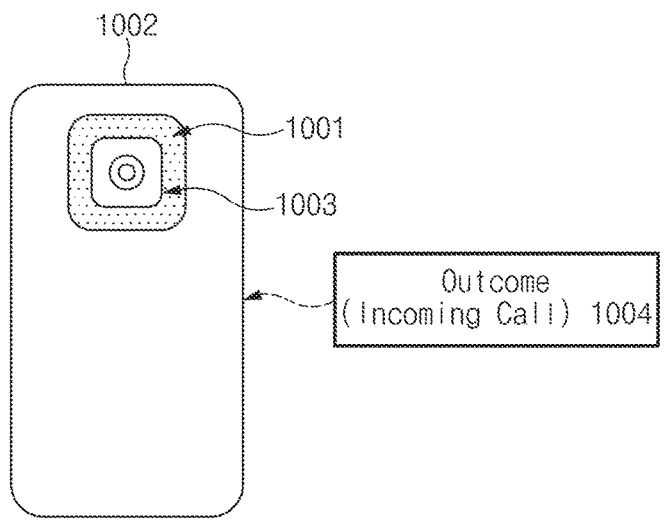

Referring to FIG. 10A, the TUI element (1001) is a ring-shaped LED mounted on a rear-camera (1003) of the mobile device (1002). Upon receiving input indicative of an outcome (1004) corresponding to an incoming call from a contact, the TUI element (1001) determines an illumination pattern to simulate the incoming call from the contact and generates the output in accordance with the illumination pattern.

Figure 10B:
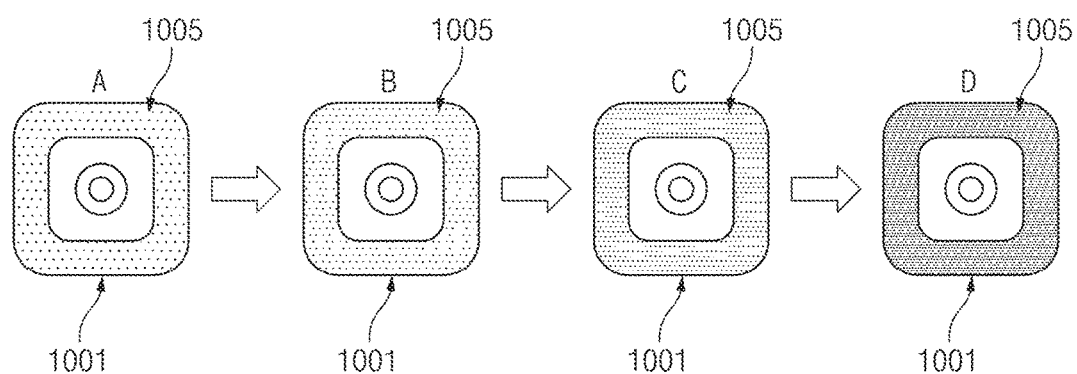

Referring to FIG. 10B, TUI element (1001) can generates output (1005) indicative of incoming call (represented by A, B, C, and D and different gradient patterns). In an example, the TUI element (1001) emits one or more colors in different conditions to simulate incoming call.

Figure 10C:
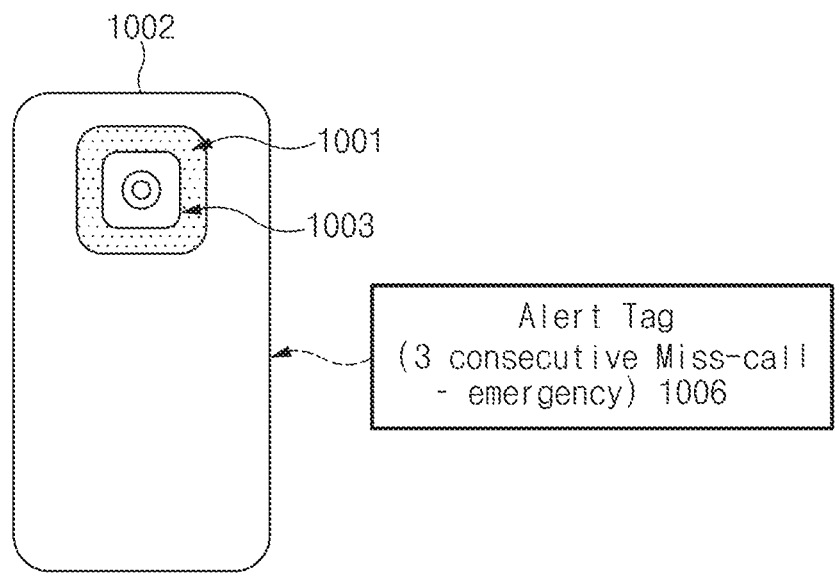

Further, referring FIG. 10C, the TUI element (1001) can determine an alert tag (1006) with respect to the outcome. The alert tag can be 'treat three consecutive miss-calls from the contact as emergency'. Upon determining the alert tag, the processor (106) transmits a trigger (1007) to the computing device to perform predefined functionality such as call the contact. The functionality is predefined or pre-set in a manner as discussed with reference to FIG. 3D.

Figure 10D:
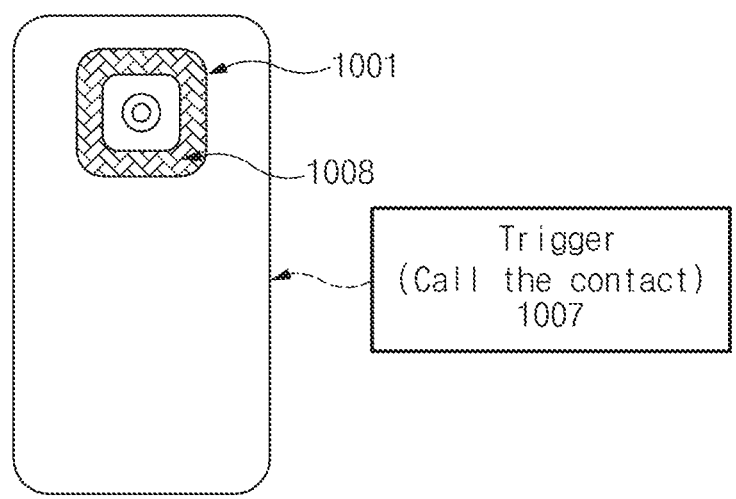

Referring to FIG. 10D, the TUI element (1001) may generate the outcome (1008) (represented by a pattern) to indicate calling the contact over a voice link.

Figure 11A:
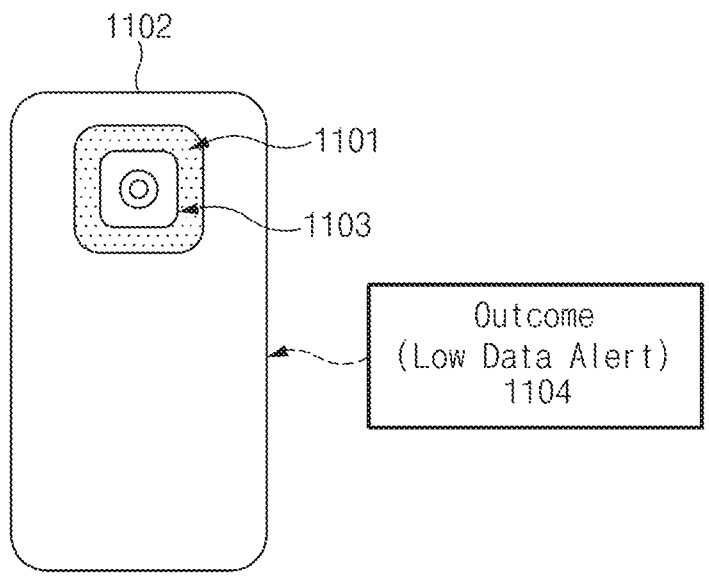
Figures 11B, 11C:
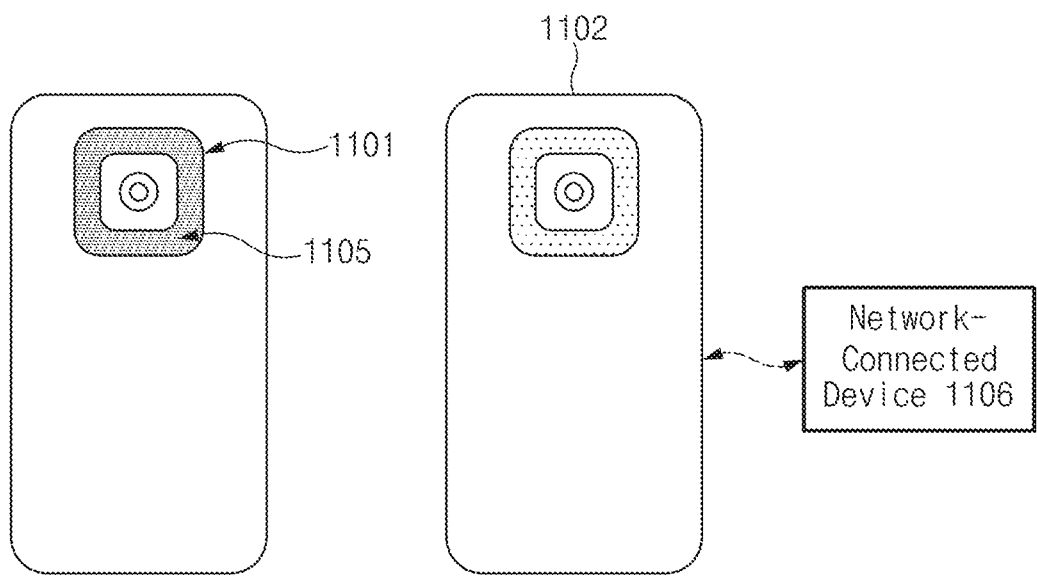

FIGS. 11A to 11C illustrates a seventh manifestation depicting a TUI element (1101) coupled to a mobile device (1102) according to an embodiment of the present disclosure.

Referring to FIG. 11A, the TUI element (1101) is a ring-shaped LED mounted on a rear-camera (1103) of the mobile device (1102). Upon receiving input indicative of outcome (1104) corresponding to low data alert from the mobile device (1102), the TUI element determines an illumination pattern to simulate the low data and generate an output.

Referring to FIG. 11B, the TUI element (1101) generates output (1105) indicative of low data (represented by a gradient pattern). In an example, the TUI element (1101) can emit red color to simulate low data.

Further, referring FIG. 11C, the TUI element (1101) can transmit a trigger to a network-connected device (1106) such as a 'data recharge device' to perform predefined functionality such as to start recharging the mobile device (1102) 'over Wi-Fi'. The functionality is predefined or pre-set in a manner as discussed with reference to FIG. 3D.

Thus, the present disclosure provides a color coded physical visual notification based on illumination pattern, which is itself, based the application invoked on the computing device and outcome received from the application. As such, the visual notification comprises information representing direction, surrounding environment, geographical direction, time, battery, surrounding environment, multimedia content, memory, multimedia message, and contact. Therefore, such visual notification comprises are easy to comprehend and to take further action on them. The user can easily comprehend the tangible visuals, tangibility leads to a faster transmission of the information in user brain as 40% of brain nerve fibers are linked to the retina (eye), and 90% of the info transmitted to brain is visual.

In addition, the tangible visuals allow access to viewing the utilities easy and upfront without require the user to unlock the device screen multiple times, thereby improving user-experience.

Further, the physical visual notification is based on the illumination patterns which are itself based on application and event creates a hierarchy in notifications, which in turn filters out a lot of noise and lets users focus on the content that matters.

FIGS. 12A to 12F illustrate an eighth manifestation depicting a TUI element (1201) coupled to a mobile device (1202) according to an embodiment of the present disclosure. The TUI element (1201) is a ring-shaped LED mounted on a rear-camera (1203) of the mobile device (1202).

Figure 12A:
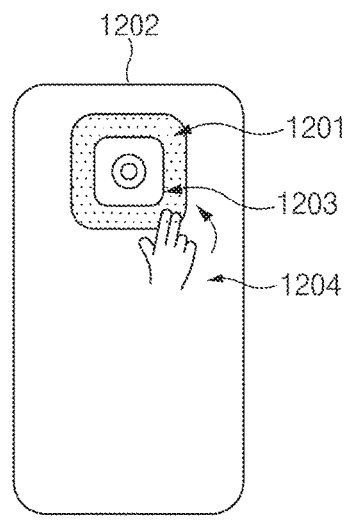

Referring to FIG. 12A, user-input (1204) is received by the TUI element (1201). The user input (1204) corresponds to invocation of a surrounding environment information application. In an example, the user-input (1204) is a two finger flick-right gesture.

Upon invoking the application, the application provides an outcome indicative of weather prediction for the next 1-2 hour or the current weather such as rainy, sunny, cloudy, and thunderstorm. Upon receiving the outcome, the TUI element (1201) determines an illumination pattern to simulate the weather and generates the output in accordance with the illumination pattern.

Figure 12B:
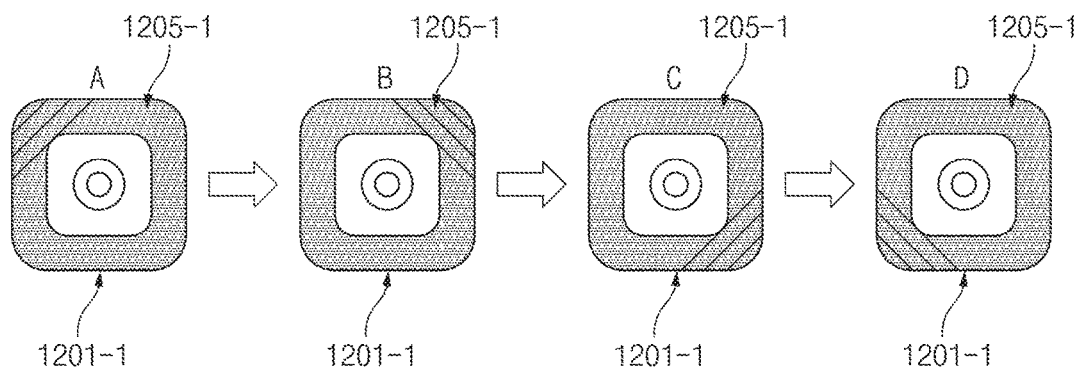

Referring to FIG. 12B, TUI element (1201-1) generates output (1205-1) indicative of current weather as thunderstorm (represented by A, B, C, and D and different patterns). In an example, the TUI element (1201-1) can emit grey color in different durations to simulate thunderstorm.

Figure 12C:
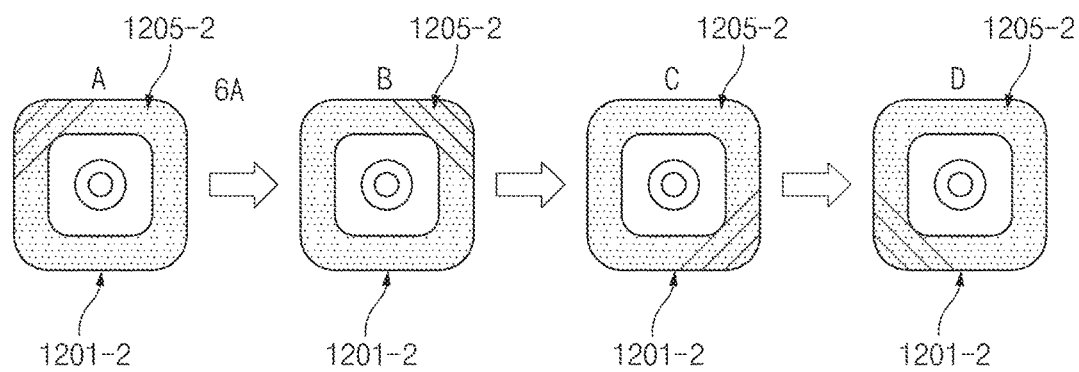

Referring FIG. 12C, TUI element (1201-2) generates output (1205-2) indicative of current weather as sunny weather (represented by A, B, C, and D and different patterns). In an example, the TUI element (1201-2) can emit yellow color in different durations to simulate sunny weather.

Figure 12D:
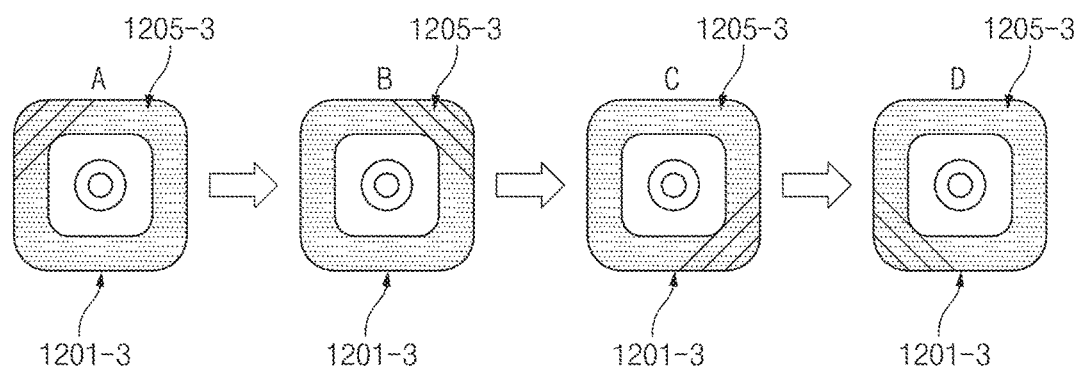

Referring FIG. 12D, TUI element (1201-3) generates output (1205-3) indicative of current weather as rainy weather (represented by A, B, C, and D and different patterns). In an example, the TUI element (1201-3) can emit blue color in different durations to simulate rainy weather.

Further, upon receiving a further user-input on the TUI element (1201) during generation of the output, the TUI element (1201) associates alert tags with the outcome. The alert tags can be used for generating out in future and providing triggers to network-connected devices. Thus, while the weather is being displayed on the TUI element (1201), if the user taps on the TUI element (1201), then the same weather can be tagged as 'alert weather' such that TUI element (1201) can again simulate the weather in future upon such detection without unlocking the device and interacting with screen elements.

Further, a user-interface is depicted on the mobile device (1202). The user-interface enables the user to select one or more network connected device and functionality. For example, the weather can be 'rainy', the network-connected devices can be smart sprinkler and smart shutters, and functionality can be 'reduce water supply of the smart sprinkler' and 'close the smart shutters'. Upon receiving the alert tag and the selection of one or more network-connected devices and corresponding functionality, the TUI element stores a mapping of the alert tag, the selected network-connected devices, and the predefined functionality.

Figure 12E:
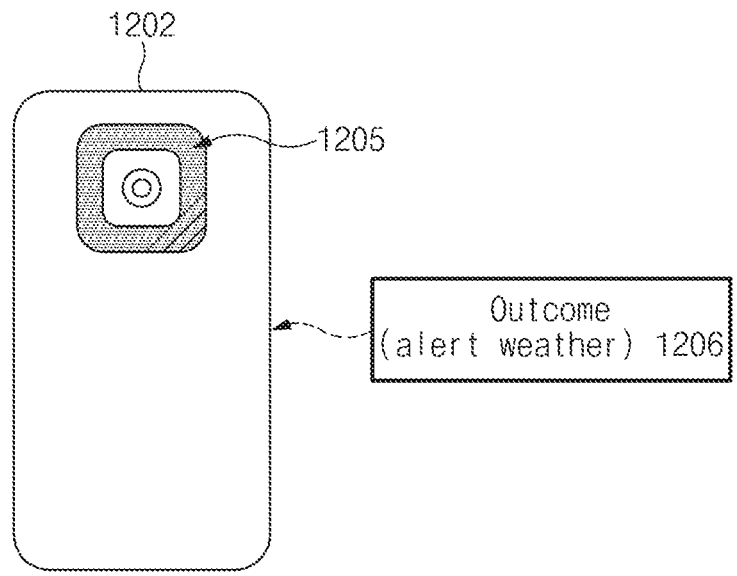
Figure 12F:
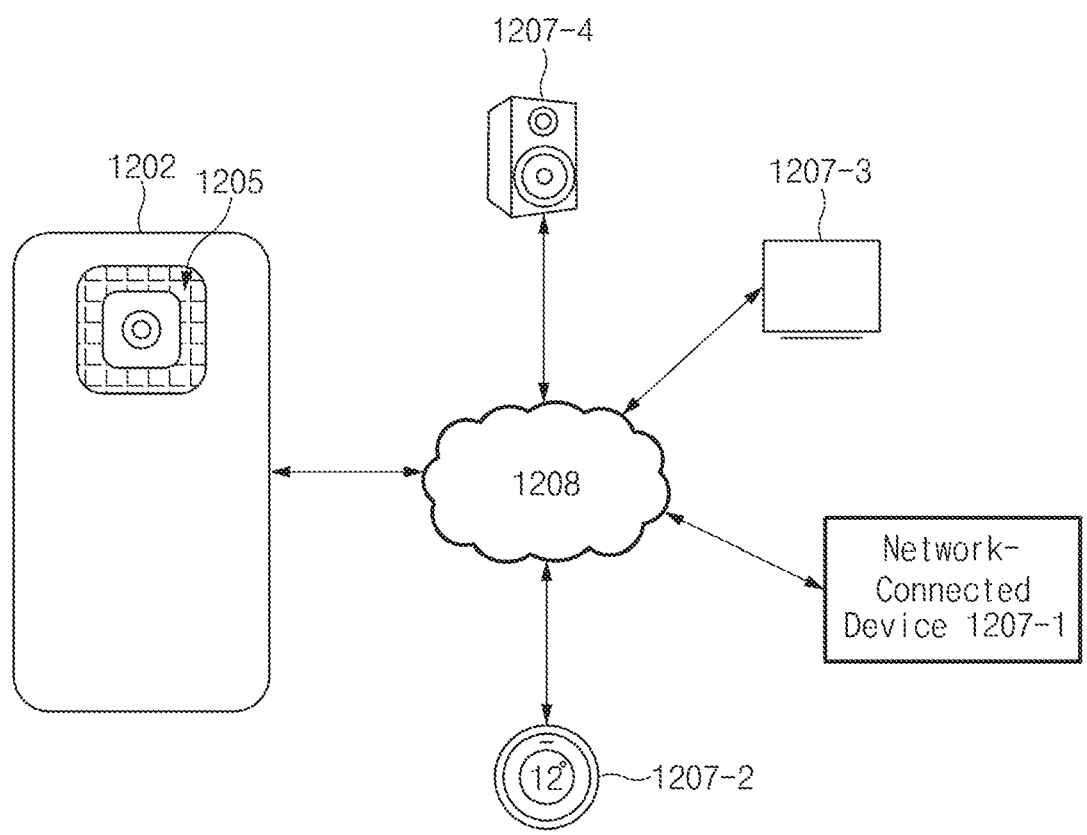

Referring to FIGS. 12E and 12F, upon receiving an input indicative of outcome (1206) corresponding to 'alert weather', the TUI element (1201) generates the corresponding output (1205) and sends trigger to the selected network-connected devices (1207-1, 1207-2, 1207-3, and 1207-4) over a communication link (1208) to activate the predefined functionalities. For the sake of brevity, only four devices have been shown. In an example, upon receiving an input corresponding to detection of 'rainy' weather, the TUI element (1201) sends trigger to the smart sprinkler to 'reduce water supply of the smart sprinkler' and to and smart shutters to 'close'.

Thus, the present disclosure provides correlation between the input, i.e., user-input and input indicative of event, and output, i.e., physical visual notification, to realize seamless coupling of physical and digital worlds. Thus, there is simulation on the TUI that enables a user to take an action on the physical visual notifications on the TUI that can trigger actions on interconnected devices.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

While the present disclosure has been shown and described with reference to various embodiments of thereof, it will be understood t by those skilled in the art that various changes in form and details may be made therein without departing from the spirit and scope of the present disclosure as defined by the appended claims and their equivalents.

What is claimed is:

1. A method implemented by a mobile device including a tangible user interface (TUI) element, the method comprising:

receiving, by the TUI element, a user input corresponding to invocation of a functionality of an application on the mobile device, obtaining an outcome corresponding to the functionality from the application;

determining at least one illumination pattern from a plurality of pre-stored illumination patterns based on the outcome; and generating an output based on the at least one determined illumination pattern, wherein the TUI element is a ring-shaped LED in square or circular form mounted on a rear camera of the mobile device.

2. The method as claimed in claim 1, wherein the application is an image capturing application and the functionality is capturing an image of at least one object.

3. The method as claimed in claim 2,
wherein the outcome corresponds to an input that is indicative of an alignment of the at least one object with respect to a capture frame selected by the user on a display of a computing device, the capture frame being defined by the user, and
wherein the capture frame is a portion of the display of the computing device where the user wants to capture the image of the at least one object.

4. The method as claimed in claim 3, wherein the capture frame defines an area on the display to capture the image of the at least one object.

5. The method as claimed in claim 3, wherein the alignment of the at least one object is one of: partially outside a rectangular frame and completely inside the rectangular frame.

6. The method as claimed in claim 5, wherein the outcome is further indicative of a predictive movement of the at least one object based on the alignment such that the at least one object is completely inside the capture frame.

7. The method as claimed in claim 6, wherein the at least one illumination pattern comprises direction information representing the predictive movement of the at least one object.

8. The method as claimed in claim 6, wherein the at least one illumination pattern comprises information representing an auto-capture of image.

9. The method as claimed in claim 5, wherein the outcome is further indicative of an auto-capture of the image of the at least object based when the at least one object is completely inside the capture frame.

10. The method as claimed in claim 3, wherein the at least one illumination pattern comprises direction information representing the alignment of the at least one object.

11. The method as claimed in claim 1, further comprising:
receiving a further user-input; and
activating a predefined functionality of a predefined application on one or more devices, the one or more devices including a computing device coupled with the TUI element.

12. The method as claimed in claim 1, wherein each of the plurality of pre-stored illumination patterns is mapped with an outcome of one or more functionalities corresponding to one or more applications.

13. The method as claimed in claim 1, further comprising:
determining an alert tag associated with the outcome, the alert tag being indicative of a predefined functionality of one or more network-connected devices, wherein the one or more network-connected devices include a computing device coupled with TUI element; and
providing a trigger to the one or more network-connected devices to activate the predefined functionality.

14. The method as claimed in claim 1, further comprising:
fetching a list of predefined applications from a memory; and
identifying availability of the application in the list such that the at least one illumination pattern is determined based on the identified availability.

15. The method as claimed in claim 1, wherein the determining of the at least one illumination pattern further comprises:
determining a state of an output device, the state being indicative of one of an on-state and an off-state;
determining a priority of the application from a list of predefined application; and
determining the at least one illumination pattern based on the state and the priority.

16. The method as claimed in claim 1, further comprising:
receiving a selection of one or more network-connected devices, such that a predefined functionality of the selected one or more network-connected devices is activated automatically at a future time upon receiving the outcome.

17. A mobile device comprising:
a camera placed in rear surface of the mobile device; and
a tangible user interface (TUI) element comprising:
an input device to receive a user input corresponding to invocation of a functionality of an application on the mobile device;
a processor coupled to the input device to obtain an outcome corresponding to a the functionality from an the application and determine at least one illumination pattern from a plurality of pre-stored illumination patterns based on the outcome; and
an optical output device coupled to the processor to generate an output based on the at least one determined illumination pattern, and
wherein the TUI element is a ring-shaped LED in square or circular form mounted on the rear camera of the mobile device.

18. The mobile device as claimed in claim 17, wherein:
the input device receives a further user-input; and
the processor activates a predefined functionality of a predefined application on one or more devices, the one or more devices including a computing device coupled with the TUI element.

19. The mobile device as claimed in claim 17, wherein the processor further:
determines an alert tag associated with the outcome, the alert tag being indicative of predefined functionality of one or more network-connected devices, wherein the one or more network-connected devices include a computing device coupled with TUI element; and
provides a trigger to the one or more network-connected devices to activate the predefined functionality.

* * * * *